(12) United States Patent
Nakata et al.

(10) Patent No.: US 10,690,558 B2
(45) Date of Patent: Jun. 23, 2020

(54) ROBOT COLLISION DETECTION METHOD

(71) Applicant: Panasonic Intellectual Property Management Co., Ltd., Osaka (JP)

(72) Inventors: Hiroyuki Nakata, Osaka (JP); Atsumi Hashimoto, Osaka (JP); Ryosuke Yamamoto, Osaka (JP); Yasuyoshi Honuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 294 days.

(21) Appl. No.: 15/580,832

(22) PCT Filed: Aug. 24, 2016

(86) PCT No.: PCT/JP2016/003855
§ 371 (c)(1),
(2) Date: Dec. 8, 2017

(87) PCT Pub. No.: WO2017/047009
PCT Pub. Date: Mar. 23, 2017

(65) Prior Publication Data
US 2018/0164170 A1    Jun. 14, 2018

(30) Foreign Application Priority Data

Sep. 16, 2015 (JP) ................. 2015-182637

(51) Int. Cl.
*G01L 5/00* (2006.01)
*B25J 19/02* (2006.01)
(Continued)

(52) U.S. Cl.
CPC .......... *G01L 5/0052* (2013.01); *B25J 9/1674* (2013.01); *B25J 19/02* (2013.01); *G01L 3/24* (2013.01);
(Continued)

(58) Field of Classification Search
CPC . B25J 19/02; B25J 9/1674; G01L 3/24; G01L 5/0052; G01L 5/226; G05B 2219/40317; Y10S 901/46
(Continued)

(56) References Cited

U.S. PATENT DOCUMENTS 7,102,315 B2 * 9/2006 Nakata .................. B25J 9/1633
318/568.22
8,650,965 B2 * 2/2014 Hashiguchi ........... B25J 9/0087
73/763
(Continued)

FOREIGN PATENT DOCUMENTS

EP   2 913 163      9/2015
JP   11-015511      1/1999
(Continued)

OTHER PUBLICATIONS

International Search Report of PCT application No. PCT/JP2016/003855 dated Sep. 27, 2016.
(Continued)

*Primary Examiner* — John H Le
(74) *Attorney, Agent, or Firm* — Wenderoth, Lind & Ponack, L.L.P.

(57) ABSTRACT

An external force torque due to a collision as a collision torque estimation value is estimated by subtracting a dynamic torque obtained by an inverse dynamic calculation of a robot from a torque output to a gear reducer by a motor. It is determined that the robot receives an external force if the collision torque estimation value is greater than a predetermined collision detection threshold.

2 Claims, 20 Drawing Sheets

(51) Int. Cl.
*G01L 3/24* (2006.01)
*B25J 9/16* (2006.01)
*G01L 5/22* (2006.01)

(52) U.S. Cl.
CPC .... *G01L 5/226* (2013.01); *G05B 2219/40317* (2013.01); *Y10S 901/46* (2013.01)

(58) Field of Classification Search
USPC ............... 702/33, 41, 99, 130, 142; 73/763; 318/568.22; 700/178, 255, 258
See application file for complete search history.

(56) References Cited

U.S. PATENT DOCUMENTS

| | | | | |
|---|---|---|---|---|
| 9,346,162 | B2* | 5/2016 | Hashiguchi | B25J 9/0087 |
| 2003/0225479 | A1* | 12/2003 | Waled | B25J 9/161 |
| | | | | 700/245 |
| 2005/0010324 | A1* | 1/2005 | Kaever | G05B 19/4061 |
| | | | | 700/178 |

| | | | |
|---|---|---|---|
| 2007/0244609 | A1 | 10/2007 | Kinoshita et al. |

FOREIGN PATENT DOCUMENTS

| | | |
|---|---|---|
| JP | 2002-144277 | 5/2002 |
| JP | 2002-283276 | 10/2002 |
| JP | 2006-167820 | 6/2006 |
| JP | 2007-286904 | 11/2007 |
| JP | 2013-169609 | 9/2013 |
| JP | 2013-184249 | 9/2013 |

OTHER PUBLICATIONS

Extended European Search Report dated Sep. 25, 2018 in European Application No. 16845887.5.
Y Yamada et al: "Human-Robot Contact in the Safeguarding Space", IEEE/ASME Transactions on Mechatronics, Dec. 1, 1997 (Dec. 1, 1997), pp. 230-236, XP055493261, DOI: 10.1109/3516.653047 Retrieved from the Internet: URL:https://ieeexplore.ieee.org/iel3/3516/14234/00653047/pdf.

* cited by examiner

ROBOT COLLISION DETECTION METHOD

This application is a U.S. national stage application of the PCT international application No. PCT/JP2016/003855 filed on Aug. 24, 2016, which claims the benefit of foreign priority of Japanese patent application No. 2015-182637 filed on Sep. 16, 2015, the contents all of which are incorporated herein by reference.

TECHNICAL FIELD

The present invention relates to a method of detecting collision of a robot driven by a motor via a gear reducer.

BACKGROUND ART

In recent years, in order to improve safety to collision and to reduce loss due to destruction in a robot, high accuracy of collision detection is required. However, accurate collision sensor increases cost, and the collision sensor as a heavy load is swung, thereby being contrary to speeding up of the robot and energy saving. Therefore, it is desired to obtain a collision force accurately without the collision sensor.

A method for obtaining a collision force at the collision without using a collision sensor is a dynamic calculation system (see NPL 1). In the dynamic calculation system, a torque output from a gear reducer is obtained by subtracting a torque which is lost due to an inertia and friction between a motor and a gear reducer from a torque generated by a driving current of the motor. A collision force is obtained by subtracting the dynamic torque of the robot obtained from an inverse dynamic calculation of the robot using the torque output from the gear reducer.

FIG. 1 is a block diagram illustrating a conventional position control of a vertically articulated robot and illustrates an outline of internal configurations of robot mechanism 161 and robot control device 162. Robot mechanism 161 includes plural arms and joint axes. The arms and the joint axes of a robot are driven by gear reducers provided around the joint axes.

In FIG. 1, main controller 64 provided in robot control device 162 outputs position commands θcom (θcom1 to θcom6) of respective axes (for example, six axes) of the robot following a locus of a movement of an arm of robot mechanism 161 instructed and stored by operation/teaching unit 63. Servo controllers 165 (1651 to 1656) of respective axes of the robot control motors 66 (661 to 666) within robot mechanism 161 so as to follow position commands θcom (θcom1 to θcom6), respectively.

FIG. 2 is a block diagram of servo controller 165 shown in FIG. 1 in detail and adds a sensorless collision detection function without using the collision sensor of the dynamic calculation system.

In FIG. 2, position control block 6 generates speed loop command ωcom according to a difference value between position command θcom and motor position feedback θm. Motor position feedback θm is obtained from encoder 51 that is a position detector attached to motor 66.

Speed control block 10 shown in FIG. 2 generates motor current command Im according to a difference value between speed loop command ωcom and motor speed feedback ωm obtained by differentiating motor position feedback θm.

Block 18 shown in FIG. 2 represents motor 66 and an external force. Assuming that gear reducer 53 is rigid, motor-generated torque τm is expressed by Formula 1 with motor torque constant Kt, motor current Im, motor angular acceleration αm, motor angular velocity ωm, motor inertia Jm, viscous friction coefficient D, dynamic friction torque τμ, dynamic torque τdyn, and collision torque τdis.

$$\tau m = Kt \times Im$$

$$\tau m = \tau dyn + \tau dis + Jm \times \alpha m + D \times \Omega m + \tau \mu \quad \text{[Formula 1]}$$

Motor angular acceleration αm is a differential value of motor angular velocity ωm. Motor inertia Jm is the sum of a rotor of motor 66 and a primary side of gear reducer 53. Dynamic torque τdyn is the sum of a gravity torque, an inertial force, a centrifugal force, and a Coriolis force.

Specifically, motor-generated torque τm is expressed by the first formula of Formula 1 viewing from a driving side of motor 66, and is expressed by the second formula of Formula 1 viewing from a load side via gear reducer 53 with respect to motor 66.

Dynamic friction torque τμ can be calculated by Formula 2 with dynamic friction coefficient Kμ.

$$\tau\mu = K\mu \times \text{sgn} \quad \text{[Formula 2]}$$

$$\text{sgn} = \begin{cases} 1 & (\omega m > 0) \\ 0 & (\omega m = 0) \\ -1 & (\omega m < 0) \end{cases}$$

Collision torque τdis that is the right side of the second formula of Formula 1 can be obtained by transforming Formula 1 to the following Formula 3.

$$\tau dis = (Kt \times Im + Jm \times \alpha m - D \times \omega m - K\mu \times \text{sgn}) - \tau dyn \quad \text{[Formula 3]}$$

In Formula 3, the term, (Kt×Im+Jm×αm−D×Ωm−Kμ×sgn), represents a torque output to gear reducer 53 by motor 66.

In FIG. 2, Formula 3 is expressed as torque estimation block 30.

In torque estimation block 30, dynamic torque estimation value τdyno is obtained by executing the inverse dynamic calculation by using the motor speed feedback and a mechanical parameter of the robot of all axes constituting the robot in torque calculation block 26. Torque estimation block 30 obtains collision torque estimation value τdiso using dynamic torque estimation value τdyno, and outputs collision torque estimation value τdiso to collision determination block 31.

Collision determination block 31 detects the collision according to Formula 4 with predetermined collision detection threshold τth.

$$|\tau diso| > \tau th \quad \text{[Formula 4]}$$

That is, in a case where Formula 4 is satisfied, main controller 64 determines that a collision occurs. In a case where Formula 4 is not satisfied, main controller 64 determines that a collision does not occur.

In torque estimation block 30 shown in FIG. 2 for obtaining collision torque estimation value τdiso, even in a case where the collision does not occur, collision torque estimation value τdiso does not become zero due to a parameter error, a model error of dynamic torque calculation, or the like. That is, in a case where the collision does not actually occur, an estimation error of the collision torque is output as collision torque estimation value τdiso.

In particular, an error of viscous friction coefficient D among the parameter errors is increased at a low temperature of about 5° C. due to an increase of viscosity of grease. The error is increased if the collision torque estimation value τdiso is obtained by using viscous friction coefficient D measured at a normal temperature. Therefore, collision detection threshold τth may be increased in order to prevent erroneous collision detection.

PTL 1 discloses a method of measuring a temperature and raising the collision detection threshold at a low temperature is disclosed, as described below.

FIGS. 3 and 4 illustrate other conventional techniques corresponding to FIGS. 1 and 2, respectively. A temperature sensor is attached to a gear reducer, and a configuration for switching the collision detection threshold is added.

In FIG. 3, temperature sensor 56 is attached to gear reducer 53. Temperature sensor output value Tc of temperature sensor 56 is input into first servo controller 165.

In FIG. 4, in threshold switching block 34, temperature sensor output value Tc is compared to predetermined temperature threshold Tcth, and collision detection threshold τvth is output to collision determination block 40 according to Formula 5 with collision detection threshold τth at a normal temperature and threshold increment dτth corresponding to a low temperature (dτth>0).

$$\tau vth = \begin{cases} \tau th & (Tc \geq Tcth) \\ \tau th + d\tau th & (Tc < Tcth) \end{cases} \quad \text{[Formula 5]}$$

Collision detection threshold τth at a normal temperature is previously obtained by actually operating gear reducer 53 at a normal temperature, for example, equal to or higher than 5° C. Threshold increment dτth corresponding to a low temperature is previously obtained by actually operating gear reducer 53 at a low temperature. for example, lower than 5° C.

Collision determination block 40 detects the collision according to Formula 6 with collision detection threshold τvth calculated in Formula 5.

$$|\tau diso| > \tau vth \quad \text{[Formula 6]}$$

That is, in a case where Formula 6 is satisfied, main controller 64 determines that a collision occurs. In a case where Formula 6 is not satisfied, main controller 64 determines that a collision does not occur.

CITATION LIST

Patent Literature

PTL 1: Japanese Patent Laid-Open Publication No. 11-15511

Non Patent Literature

NPL 1: Kazuhiro Kosuge et al., "Dynamic Collision Detection Method for Manipulator", Japan Society of Mechanical Engineers [No. 99-9] Robotics-Mechatronics Lecture '99 Lecture paper collection 2A1-11-030

SUMMARY

A collision of a robot is detected by the following method. The robot includes a motor, a gear reducer connected to the motor, an encoder detecting a rotation of the motor, a temperature sensor installed to the encoder, and an object which is driven by the motor via the gear reducer. An external force torque caused by a collision is estimated as a collision torque estimation value by subtracting a dynamic torque obtained by an inverse dynamic calculation of the robot from a torque output to the gear reducer by the motor. It is determining that the robot receives an external force if the collision torque estimation value is greater than a predetermined collision detection threshold. The predetermined collision detection threshold is set to a first value in a case where a temperature detected by the temperature sensor is less than a predetermined temperature threshold. The predetermined collision detection threshold is set to a second value less than the first value at a first time point at which the detected temperature is equal to or greater than the predetermined temperature threshold in a case where a maximum value of the collision torque estimation value is less than a first maximum value determination threshold in a period to the first time point from a second time point prior to the first time point by a predetermined length of time. The predetermined collision detection threshold is set to the first value at the first time point in a case where the maximum value of the collision torque estimation value is equal to or greater than the first maximum value determination threshold in the period.

This method reduces occurrence of collision erroneous detection even in a case where the collision detection threshold is switched by using the temperature sensor installed to the encoder.

DETAIL DESCRIPTION OF EXEMPLARY EMBODIMENTS

Figure 3:
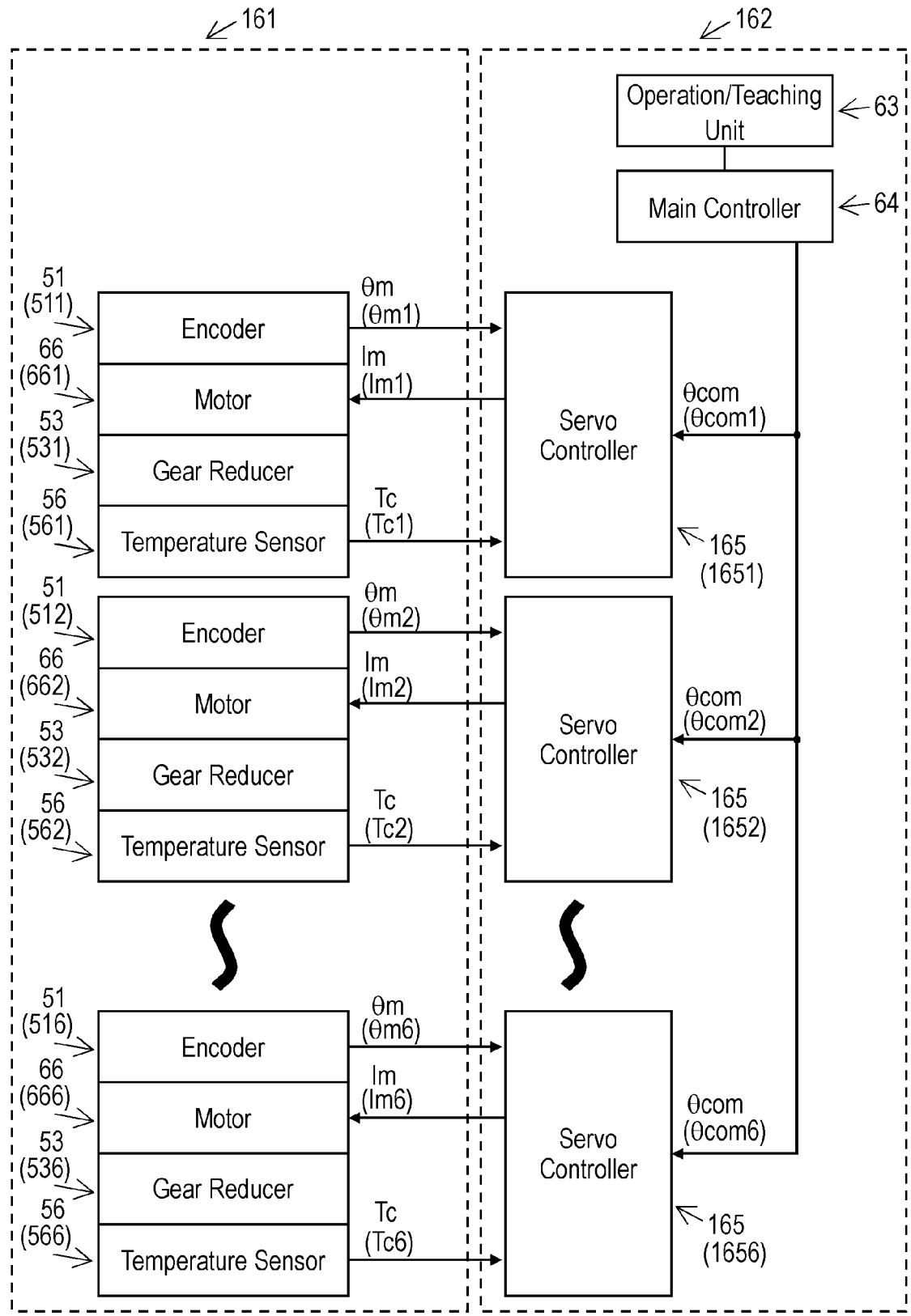
FIG. 3 is a block diagram illustrating a conventional configuration of another conventional position control of a robot.

In order to measure a temperature of gear reducer 53 with a configuration illustrated in FIG. 3, temperature sensor 56 is attached to gear reducer 53, but increases cost. In order to input temperature sensor output value Tc into servo controller 165 of robot control device 162, it is necessary to increase the number of cables within robot mechanism 161. This configuration may cause a problem in reliability of wiring processing, such as disconnection.

In recent years, a temperature sensor is installed to an encoder, a position detector of a motor, which is installed to or attached to the motor. A temperature can be read with serial communication data together with position information.

If a temperature in the encoder increases and is equal to or higher about 90° C. due to heat generated by the motor, an electronic component configuring the encoder erroneously operates and may not transmit correct position information. Therefore, the temperature sensor is installed to the encoder. If the temperature becomes equal to or higher than a predetermined value (about 90° C.), an alarm signal is output as a serial signal.

Figure 1:
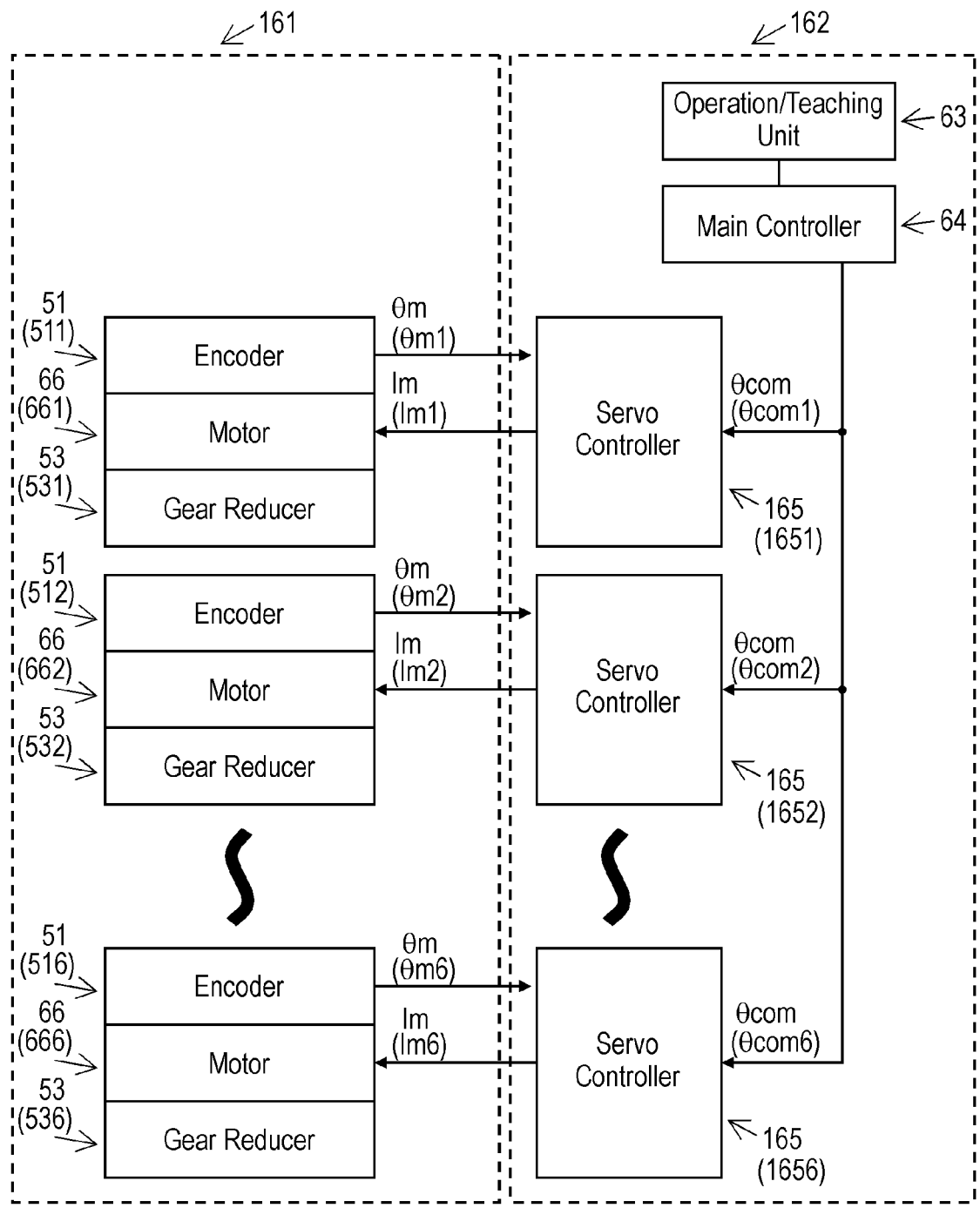
FIG. 1 is a block diagram illustrating a configuration of a conventional position control of a robot.
Figure 2:
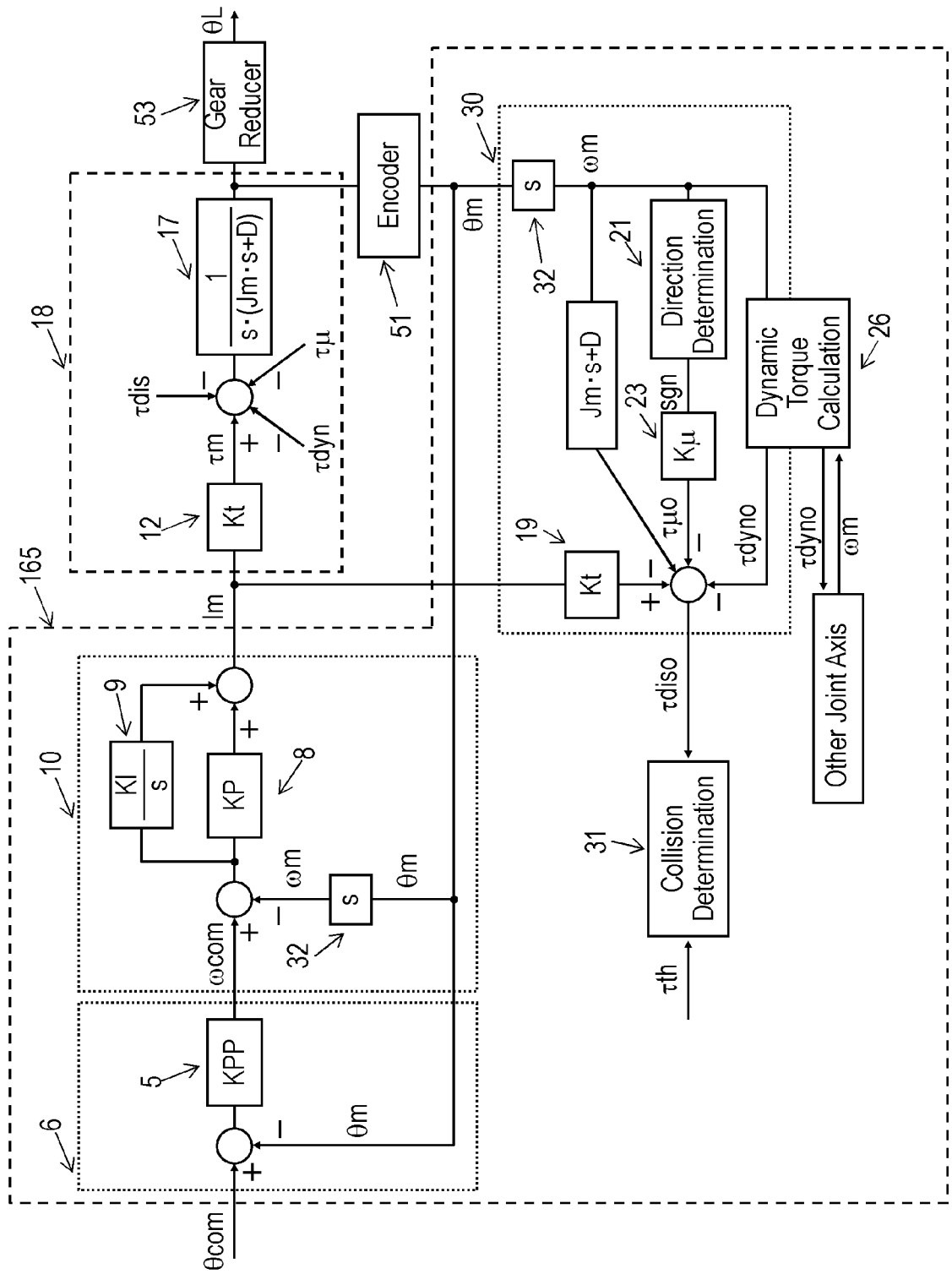
FIG. 2 is a block diagram illustrating a collision detection method in the configuration illustrated in FIG. 1.
Figure 5:
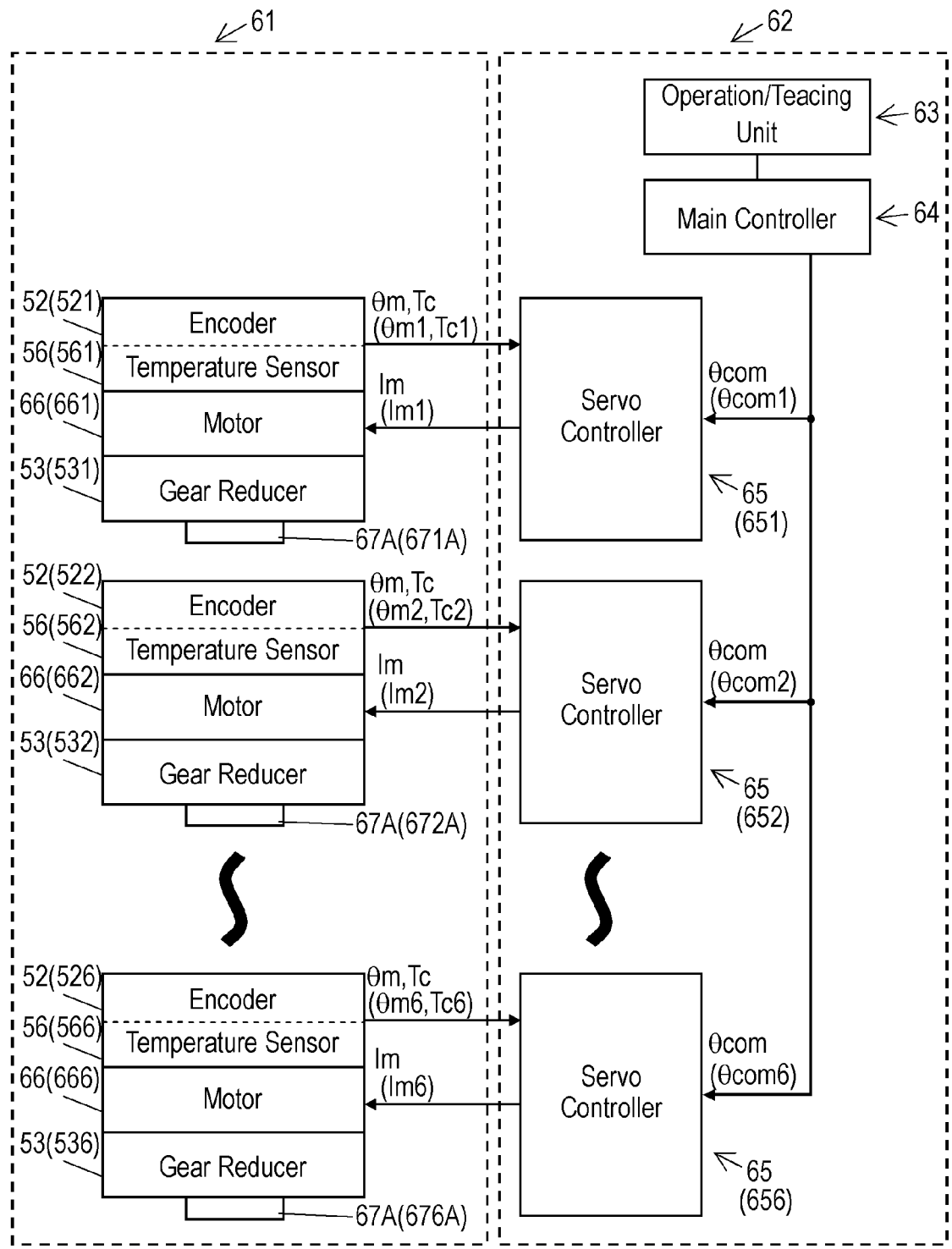
FIG. 5 is a block diagram illustrating a configuration of a still another conventional position control of a vertically multi-axial robot.

FIG. 5 illustrates a configuration in which encoders 51 (511 to 516) illustrated in FIG. 1 are replaced with encoders 52 (521 to 526) having temperature sensors 56 (561 to 566) installed therein, respectively. Motor 66 (661 to 666) drive joint axes 67A (671A to 676A) which are objects via gear reducers 53 (531 to 536), respectively. Since temperature sensor output value Tc of temperature sensor 56 installed to encoder 52 is read by the same serial communication as the position information, the cost is not increased and the number of cables within the robot is not increased.

Figure 6:
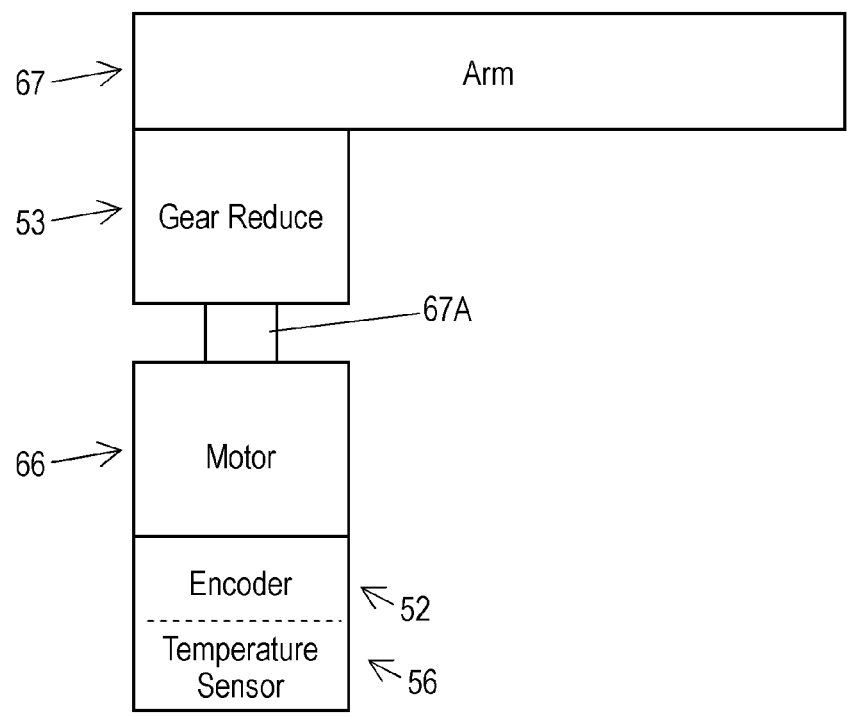
FIG. 6 is a diagram illustrating a positional relationship of a motor with an encoder directly attached to a gear reducer.
Figure 7:
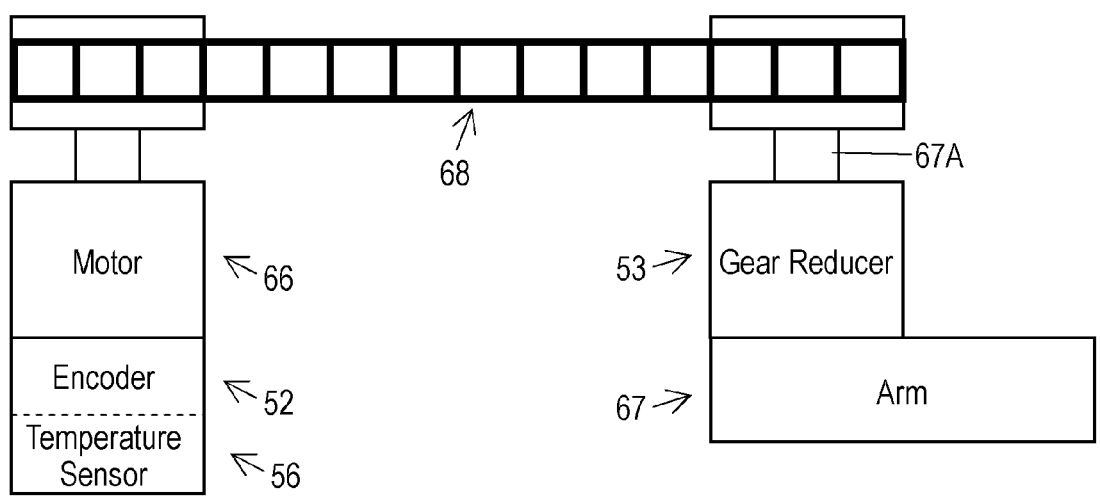
FIG. 7 is a diagram illustrating a positional relationship of a belt provided between a gear reducer and the motor with the encoder.

The temperature is a temperature inside encoder 51 of motor 66 and is not a temperature of the gear reducer. FIG. 6 illustrates a positional relationship in which motor 66 having encoder 51 attached therein is directly attached to gear reducer 53. FIG. 7 illustrates a positional relationship in which belt 68 is provided between gear reducer 53 and motor 66 having encoder 51 attached thereto. As illustrated in FIG. 6, in a configuration where gear reducer 53 is directly connected to motor 66, it is considered that the temperature of gear reducer 53 is increased to substantially the same level as the internal temperature of encoder 51. However, as illustrated in FIG. 7, in a configuration where belt 68 is provided between motor 66 and gear reducer 53, the temperature of gear reducer 53 may not be increased to substantially the same level as the internal temperature of encoder 52.

When the internal temperature of encoder 52 which is installed to or attached to motor 66 exceeds predetermined temperature threshold Tcth, collision detection threshold τvth is calculated in accordance with Formula 5. Then, threshold increment dτth corresponding to a low temperature is eliminated. Then, detection threshold τvth is restored to collision detection threshold τth corresponding to a normal temperature which is not taken into consideration the low temperature which is an original value. In this case, if an increase in temperature of gear reducer 53 to which a driving force of motor 66 is transmitted is not sufficient, an error of collision torque estimation value τdiso due to high viscous friction coefficient D is greater than collision detection threshold τvth, hence providing collision erroneous detection.

Exemplary Embodiment

Figure 8:
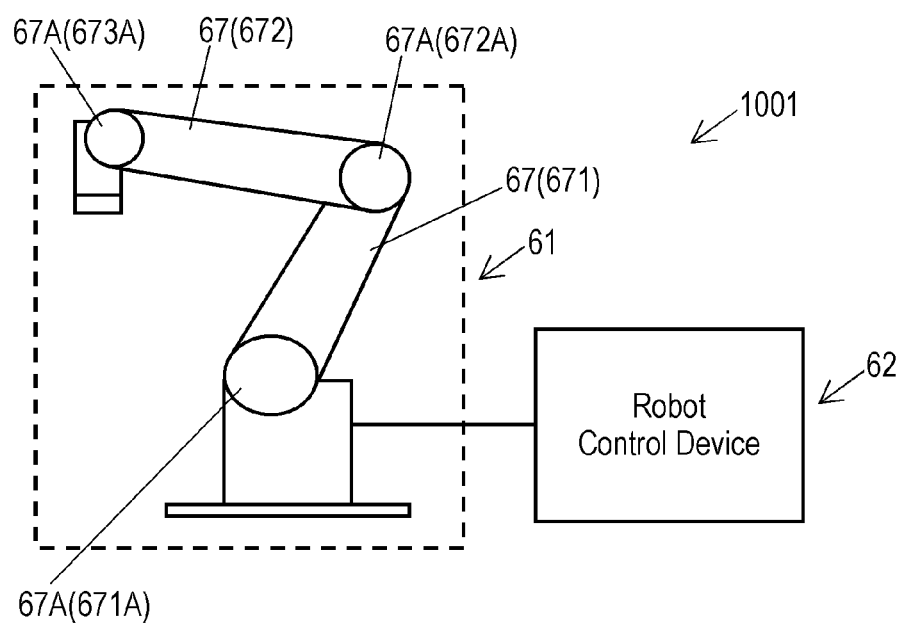
FIG. 8 is a schematic configuration view of the robot in accordance with an exemplary embodiment.

FIG. 8 is a schematic view of the robot 1001 that is a vertical multi-joint six-axis robot. Robot 1001 includes robot mechanism 61 and robot control device 62. Robot mechanism 61 includes plural arms 67 and plural joint axes 67A (671A to 676A), and is driven via a gear reducer close to each joint axis.

Figure 4:
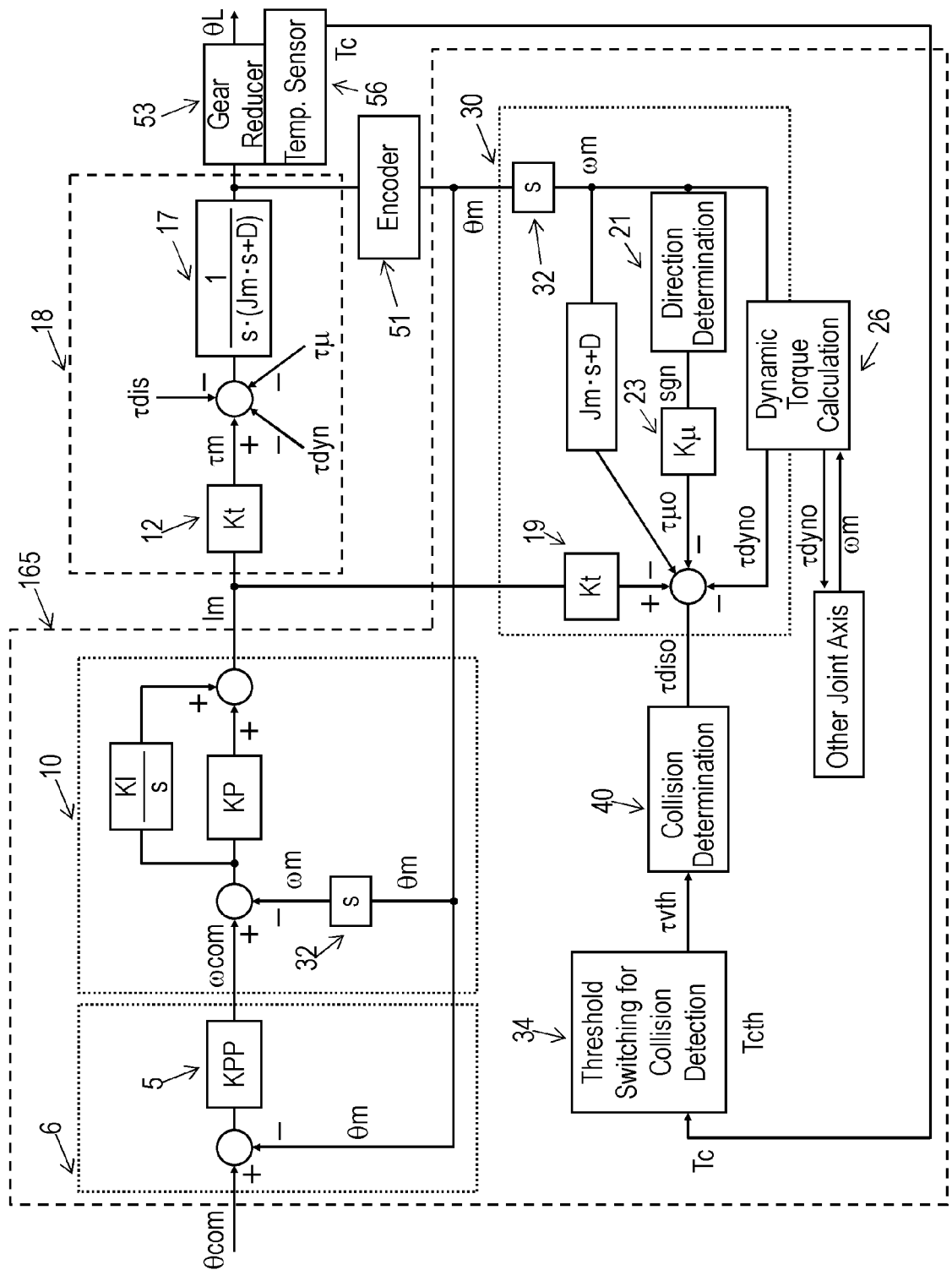
FIG. 4 is a block diagram illustrating a collision detection method in the configuration illustrated in FIG. 3.
Figure 9:
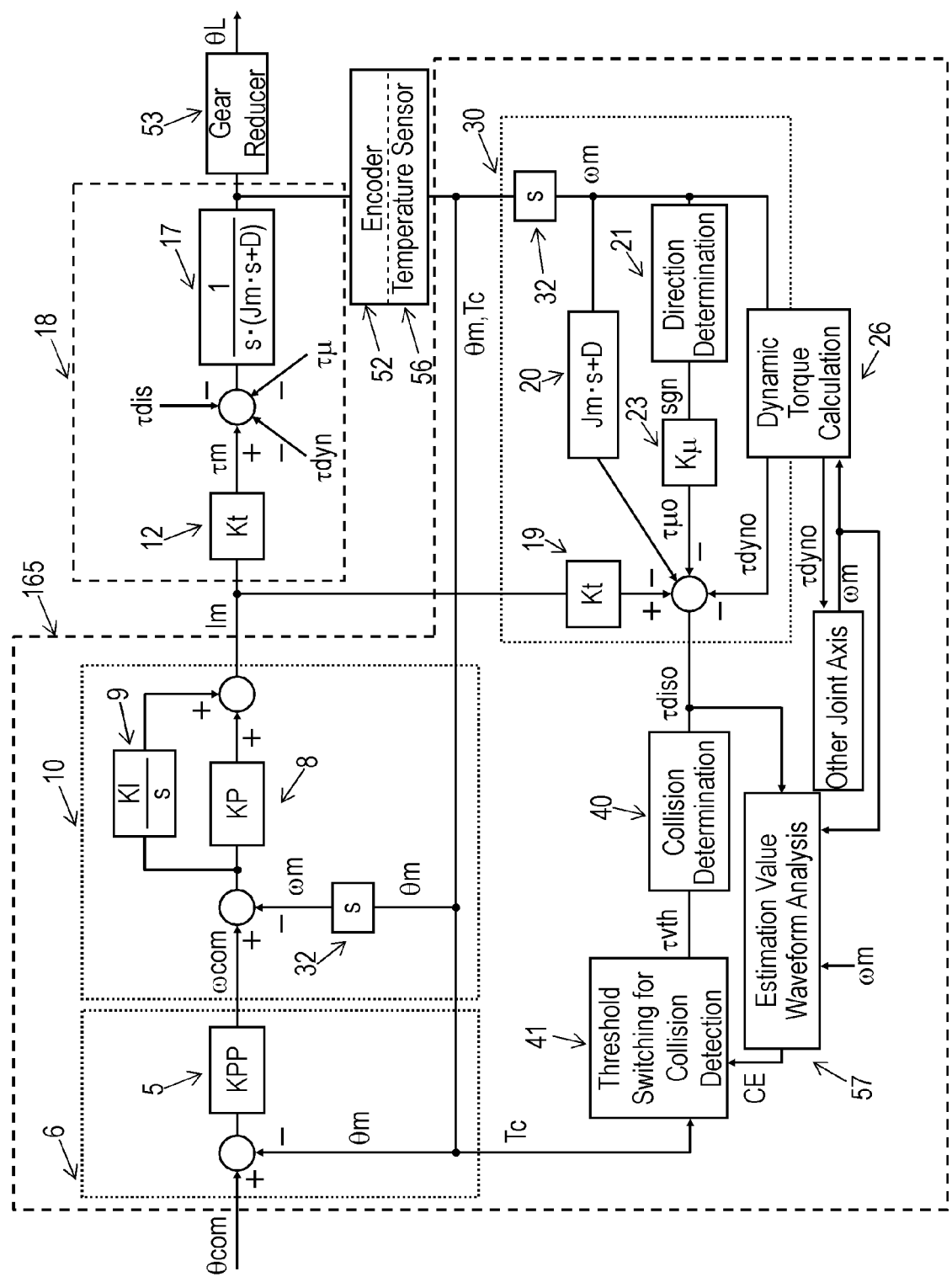
FIG. 9 is a block diagram illustrating a collision detection method in accordance with the embodiment.

FIG. 9 is a block diagram illustrating a collision detection method in accordance with the embodiment. FIG. 9 further illustrates waveform analysis block 57 based on a dynamic calculation system illustrated in FIG. 4.

Figure 10:
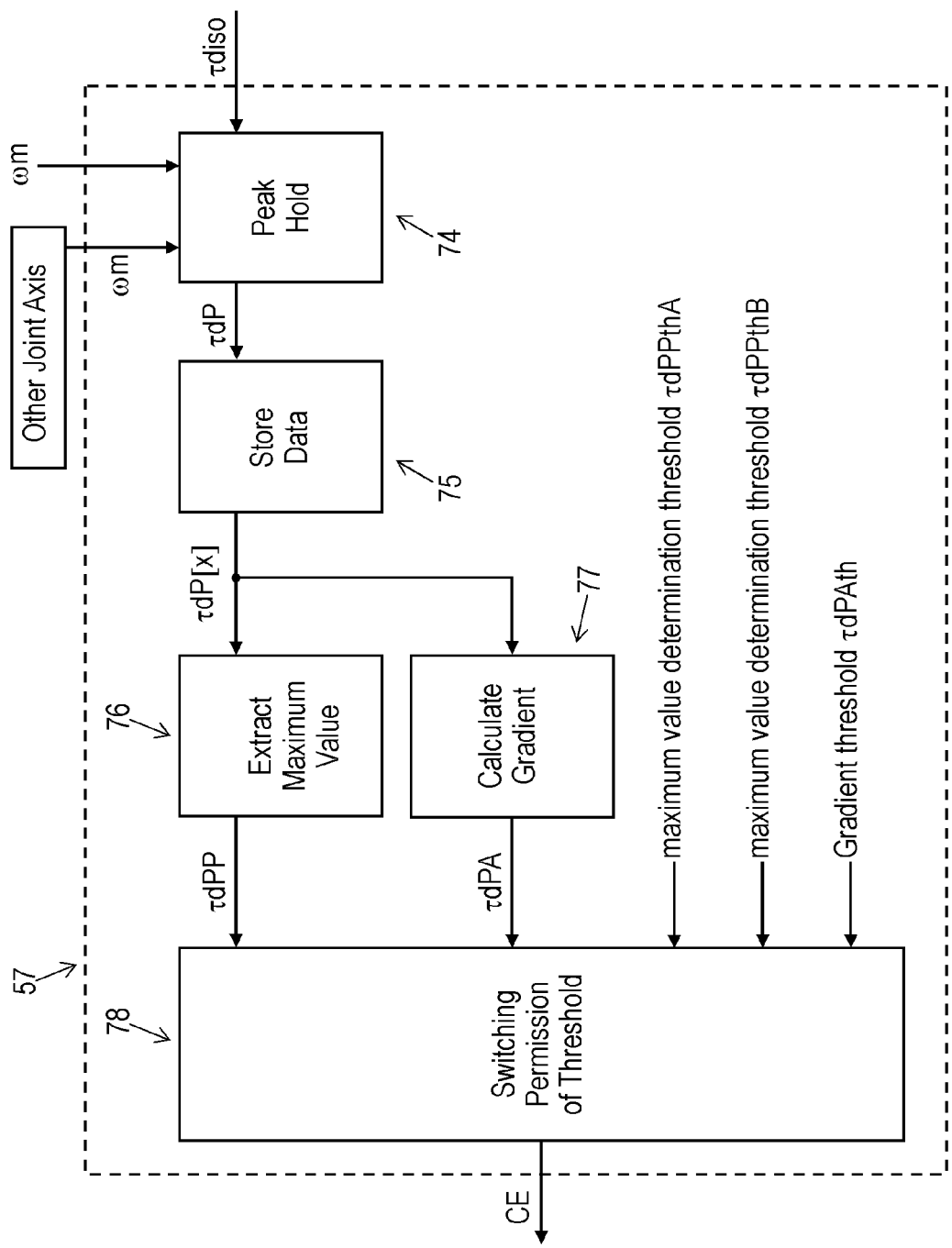
FIG. 10 is a block diagram illustrating details of a waveform analysis block in accordance with the embodiment.

FIG. 10 illustrates details of waveform analysis block 57. In the following description, a unit time is defined as an interval for performing a waveform analysis of a collision torque estimation value. In accordance with the embodiment, the unit time is, for example, one minute. The unit time refers to the time during which robot 1001 operates excluding the time during which robot 1001 is stopped.

Peak hold block 74 calculates peak hold value τdP that is a value obtained by holding a peak of an absolute value of collision torque estimation value τdiso within the unit time.

Figure 11:
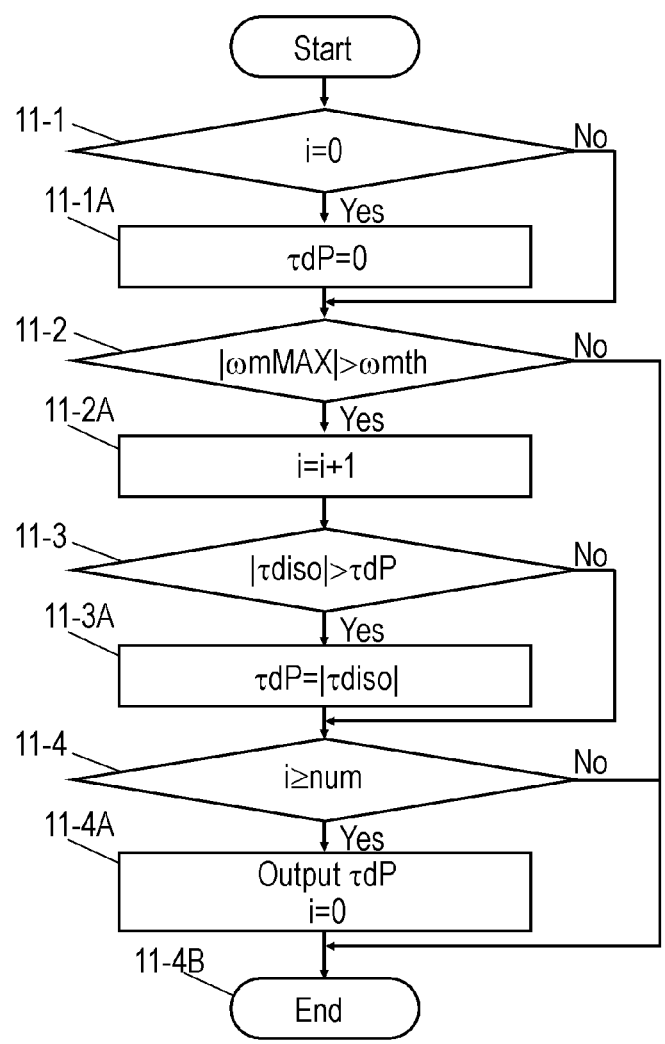
FIG. 11 is a flowchart illustrating processing of a maximum value extracting block in accordance with the embodiment.

An operation of motor 661, gear reducer 531, encoder 52, and temperature sensor 561 for driving joint axis 671A among plural joint axes 67A (671A to 676A) will be described. FIG. 11 is a flowchart illustrating a method of calculating peak hold value τdP. Main controller 64 executes processing shown in FIG. 11 a predetermined number of times for each calculation cycle within the unit time of collision torque estimation value τdiso. The calculation cycle is several milliseconds in accordance with the embodiment. Main controller 64 calculates and outputs peak hold value τdP by performing the operation illustrated in FIG. 11 a predetermined number "num" of times within the unit time.

Peak hold block 74 determines whether or not the number i of peak holds is 0 (step 11-1). If the number i is 0 in step 11-1, that is, if it is the first time ("Yes" of step 11-1), peak hold block 74 clears peak hold value dP to zero (step 11-1A). If the number i is not zero in step 11-1, that is, if it is the first time ("No" of step 11-1), main controller 64 does not change peak hold value τdP to leave it as it is.

Peak hold block 74 determines whether or not an absolute value of angular velocity ωmMAX having the maximum absolute value among angular velocities ωm of joint axis 671A and joint axes 672A to 676A is greater than angular velocity threshold ωmth (step 11-2). Angular velocity threshold ωmth is a threshold for determining whether or not the peak hold is executed. In a case where the absolute value of angular velocity ωmMAX is greater than angular velocity threshold ωmth in step 11-2 ("Yes" of step 11-2), peak hold block 74 increases the number i of the peak hold by 1 (step 11-2A). In a case where the absolute value of angular velocity ωmMAX is not greater than angular velocity threshold ωmth in step 11-2 ("No" of step 11-2), peak hold block 74 completes processing (step 11-4B).

The reason for setting a condition of step 11-2 is that an error of collision torque estimation value τdiso caused by high viscous friction coefficient D is not generated in a case where robot 1001 stops due to a stopping operation by a user, waiting for input of a sensor signal, or the like.

In the operation illustrated in FIG. 11, angular velocity ωm of motor 66 is monitored, but another parameter that can confirm that robot 1001 operates may be monitored instead of angular velocity ωm. For example, when an operation command is executed in a program of robot 1001, a robot operation may be determined when a position command is generated or the like.

Peak hold block 74 determines whether or not an absolute value of collision torque estimation value τdiso obtained with using dynamic torque estimation value τdyno by torque estimation block 30 is greater than peak hold value τdP (step 11-3). If the absolute value of collision torque estimation value τdiso is greater than peak hold value τdP in step 11-3 ("Yes" of step 11-3), peak hold block 74 updates peak hold value τdP to cause peak hold value τdP to be the absolute value of collision torque estimation value τdiso. If the absolute value of collision torque estimation value τdiso is not greater than peak hold value τdP in step 11-3 ("No" of step 11-3), peak hold block 74 does not change peak hold value τdP to leave it as it is.

Peak hold block 74 determines whether or not the number i of peak hold reaches the end number "num" and is equal to or greater than the end number "num" (step 11-4). If the number i of peak holds is equal to or greater than the end number "num" in step 11-4 ("Yes" of step 11-4), peak hold block 74 outputs peak hold value τdP, the number i is cleared to 0 (step 11-4A), and completes the processing in step 11-4B. If the number i of peak hold is less than the end number "num" in step 11-4 ("No" of step 11-4), peak hold block 74 does not change the number i to leave it as it is and completes the processing in step 11-4B.

Next, peak hold value τdP for the unit time output from peak hold block 74 is stored in data storage block 75. Peak hold value τdP of the x-th unit time (which is, for example, x minutes in a case that the unit time is one minute) as collision torque estimation value τdiso is defined as peak hold value τdP[x]. In a case where N peak hold values τdP are currently stored at the x-th unit time, data storage block 75 stores peak hold values τdP[x−N+1], τdP[x−N+2], . . . , τdP[x].

For example, in a case where the current time as a switching time point of collision detection threshold τth is the thirtieth unit time (x=30) and, for example, the data storage number N is ten (N=10) prior to the switching time point by a predetermined length of time (by x minutes in the case that the unit time is one minute), data storage block 75 stores peak hold values τdP[30], τdP[29], . . . , τdP[21]. If the unit time is one minute, data of 10 minutes in which robot 1001 operates is stored.

Maximum value extracting block 76 shown in FIG. 10 obtains maximum value τdPP among peak hold values τdP[x−N+1], τdP[x−N+2], . . . , τdP[x].

Figure 12:
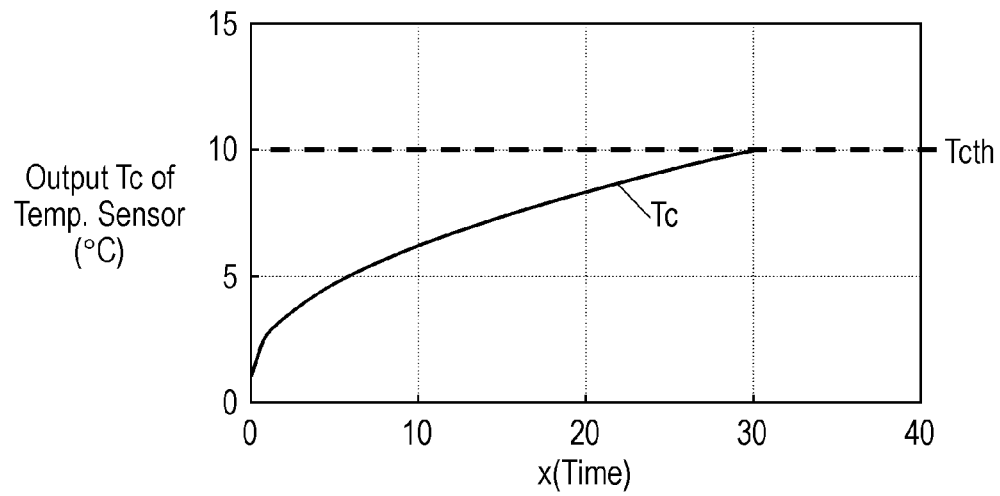
FIG. 12 is a diagram illustrating a waveform in the collision detection method in accordance with the embodiment.
Figure 12:
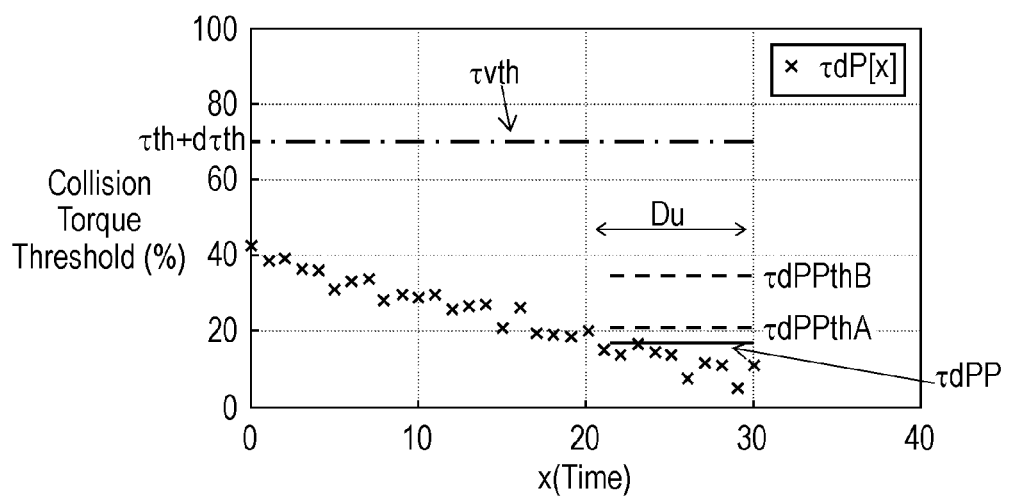
Figure 12:
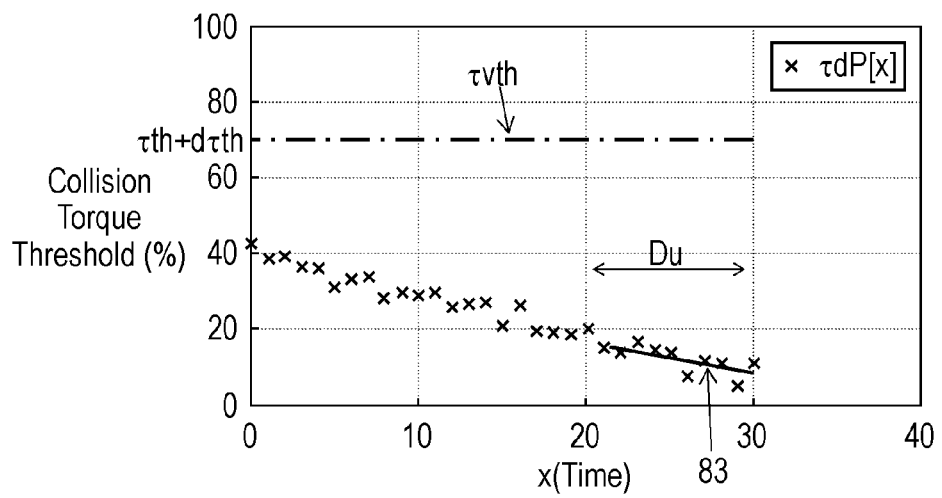

FIG. 12 illustrates temperature sensor output value Tc of temperature sensor 56 installed to encoder 52 and peak hold value τdP[x] of the x-th time. In FIG. 12, a vertical axis represents temperature sensor output value Tc and peak hold value τdP[x] that is the collision torque, and a horizontal axis represents the number x of the unit times. In FIG. 12, the collision torque or the threshold of the vertical axis is indicated as the maximum torque ratio (%) which is a ratio with respect to the maximum torque. At the time point x of 0≤x≤30 illustrated in FIG. 12, no collision actually occurs and in a case where collision torque estimation value τdP[x] decreases as an increase in temperature, that is, a case where an error of collision torque estimation value τdP[x] decreases due to a decrease in the viscous friction coefficient D is illustrated.

In FIG. 12, a condition of Tc≥Tcth is satisfied at the time point of x=30 and maximum value τdPP at this time is illustrated. The number N of the stored data is 10.

Gradient calculation block 77 shown in FIG. 10 calculates gradient τdPA of approximate straight line 83 from collision torque estimation values τdP[x−N+1] to τdP[x].

In FIG. 12, approximate straight line 83 approximates peak hold value τdP[x] as an estimated value of the collision torque from the time point of x=30 for a predetermined length of time. The gradient of approximate straight line 83 is calculated to obtain gradient τdPA.

Figure 13:
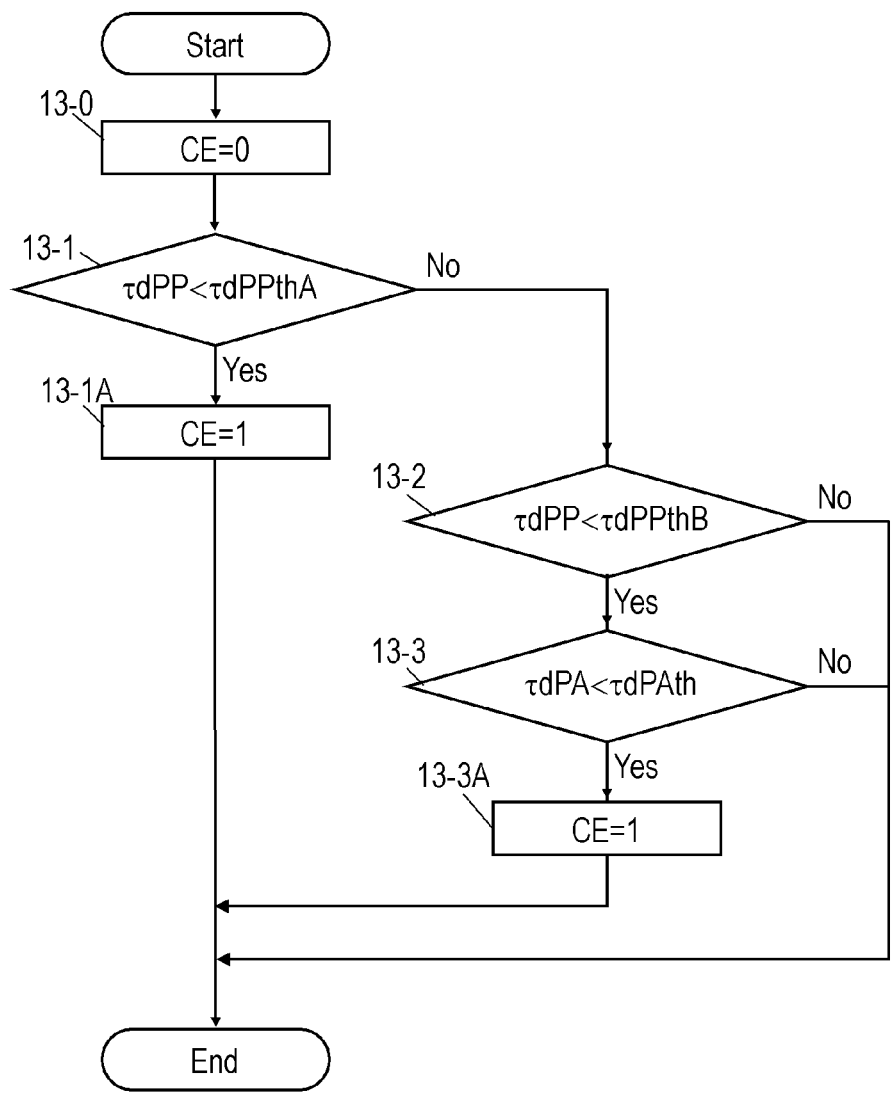
FIG. 13 is a flowchart illustrating processing of a switching permission determination block in accordance with the embodiment.

FIG. 13 is a flowchart illustrating processing executed by switching permission determination block 78 shown in FIG. 10. Next, switching permission determination block 78 executes the processing illustrated in the flowchart of FIG. 13.

Switching permission determination block 78 first sets (clears) switching permission value CE to, e.g. zero, a number other than "1" (step 13-0).

After that, switching permission determination block 78 determines whether or not maximum value τdPP that is the maximum value of the collision torque in period Du to the switching time point of the collision detection threshold from a time point prior to the switching time point by a predetermined length of time is less than maximum value determination threshold τdPPthA (step 13-1). If maximum value τdPP is less than maximum value determination threshold τdPPthA in step 13-1 ("Yes" of step 13-1), switching permission determination block 78 sets switching permission value CE to "1" and completes processing of (step 13-1A).

In a case where maximum value τdPP is not less than maximum value determination threshold τdPPthA in step 13-1 ("No" of step 13-1), switching permission determination block 78 determines whether or not maximum value τdPP is less than maximum value determination threshold τdPPthB (step 13-2). If maximum value τdPP is not less than maximum value determination threshold τdPPthB in step 13-2 ("No" of step 13-2), processing is completed. Maximum value determination threshold τdPPthA, maximum value determination threshold τdPPthB, and collision detection threshold τth at a normal temperature are determined so as to satisfy a relationship of τdPPthA<τdPPthB<τth.

In a case where maximum value τdPP is less than maximum value determination threshold τdPPthB in step 13-2 ("Yes" of step 13-2), switching permission determination block 78 determines whether or not gradient τdPA of approximate straight line 83 is less than gradient determination threshold τdPAth (step 13-3). If maximum value τdPP is less than gradient determination threshold τdPAth in step 13-3 ("Yes" of step 13-3), switching permission determination block 78 sets switching permission value CE to "1" and completes the processing. In a case where maximum value τdPP is not less than gradient determination threshold τdPAth in step 13-3 ("No" of step 13-3), switching permission determination block 78 completes the processing without doing anything.

In the example shown in FIG. 12, maximum value determination thresholds τdPPthA and τdPPthB, and gradient determination threshold τdPAth are set as τdPPthA=20, τdPPthB=35, and τdPAth=0. At the time point of x=30, since a relationship of τdPP<τdPPthA is satisfied, switching permission determination block 78 set switching permission value CE to "1" in step 13-1.

In FIG. 9, threshold switching block 41 outputs collision detection threshold τvth to the collision determination block in accordance with Formula 7 with collision detection threshold τth corresponding to the normal temperature and threshold increment dτth corresponding to the low temperature.

$$\tau vth = \begin{cases} \tau th & (Tc \geq Tcth \text{ and } CE = 1) \\ \tau th + d\tau th & (Tc < Tcth) \end{cases} \quad \text{[Formula 7]}$$

As indicated in Formula 7, in a case of Tc≥Tcth and CE=1, threshold switching block 41 outputs collision detection threshold τth corresponding to the normal temperature as collision detection threshold τvth. In a case of Tc<Tcth, threshold switching block 41 outputs the sum of threshold increment dτth and collision detection threshold τth corresponding to the normal temperature as collision detection threshold vth regardless of the value of the permission value CE.

Since temperature sensor output value Tc is an internal temperature inside encoder 51 of motor 66 and is not the temperature of gear reducer 53, temperature threshold Tcth is not necessarily the temperature (for example, approximately 5° C.) of gear reducer 53 when collision detection threshold τth and threshold increment dτth are determined, and may be set to, for example, 10° C. in consideration of a margin.

Figure 14:
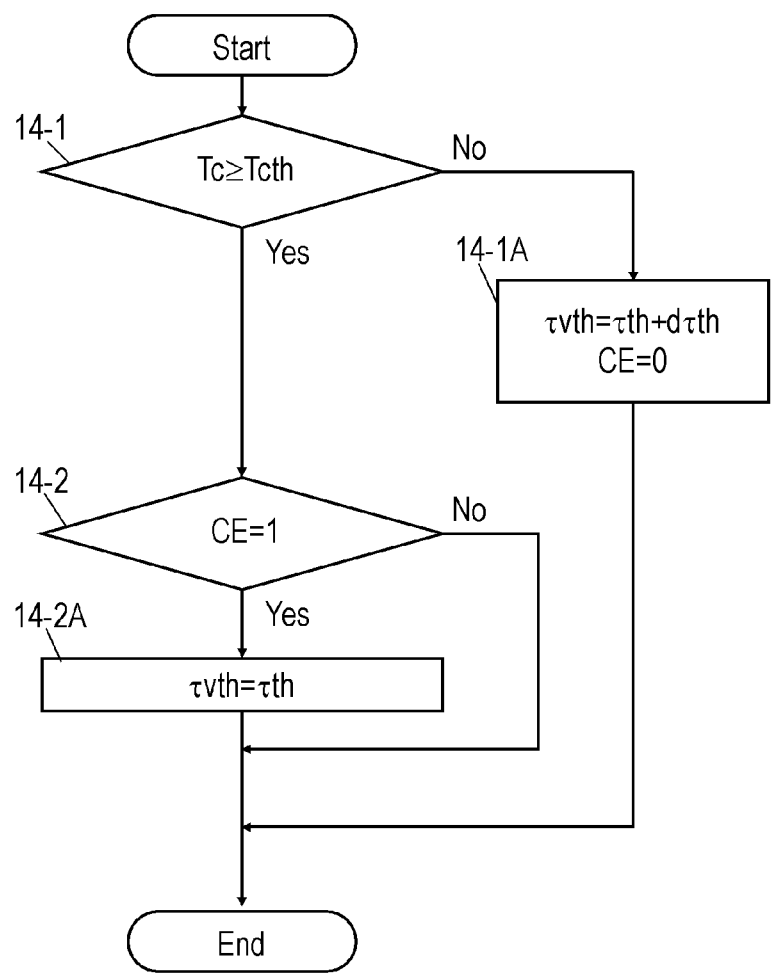
FIG. 14 is a flowchart illustrating processing of a threshold switching block in accordance with the embodiment.

FIG. 14 is a flowchart illustrating processing of Formula 7 executed by threshold switching block 41.

Threshold switching block 41 determines whether or not temperature sensor output value Tc is equal to or greater than predetermined temperature threshold Tcth (step 14-1). In a case where temperature sensor output value Tc is equal to or greater than predetermined temperature threshold Tcth in step 14-1 ("No" of step 14-1), a value (τth+dτth) which is obtained by adding collision detection threshold τth to threshold increment dτth is output as collision detection threshold τvth. The permission value CE is set to zero, and the processing is completed.

In a case where temperature sensor output value Tc is equal to or greater than predetermined temperature threshold Tcth in step 14-1 ("Yes" of step 14-1), threshold switching block 41 determines whether or not switching permission value CE is "1" (step 14-2). In a case where switching permission value CE is "1" in 14-2 ("Yes" of step 14-2), threshold switching block 41 sets collision detection threshold τth to collision detection threshold τvth corresponding to the normal temperature (step 14-2), does not change the permission value CE to leave it as it is, and completes the processing.

Figure 15:
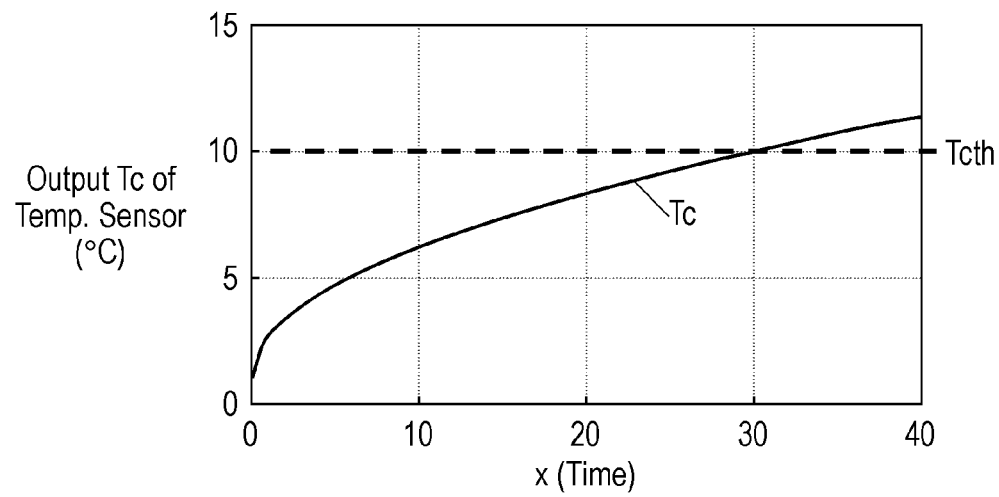
FIG. 15 is a diagram illustrating an operation in the collision detection method in accordance with the embodiment.
Figure 15:
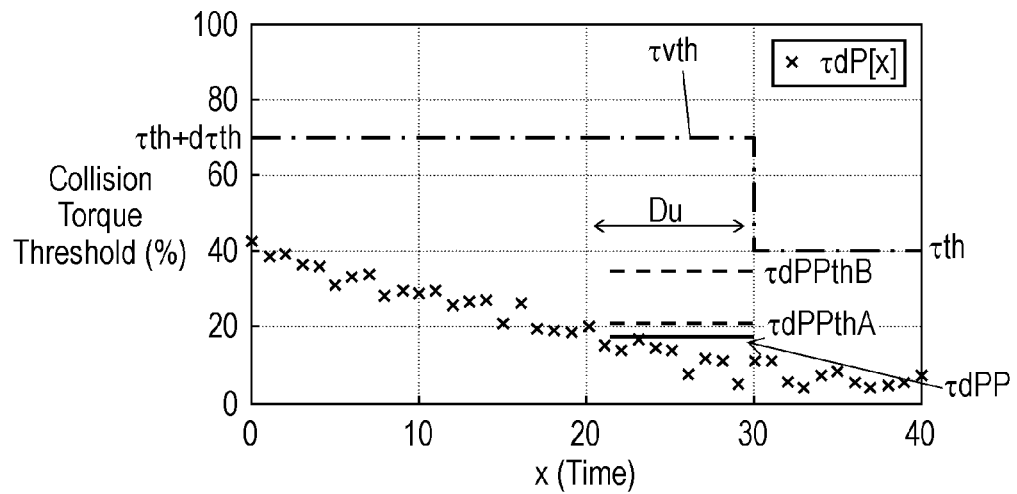

In FIG. 12, at the time point of x=30, both Tc≥Tcth ("Yes" of step 14-1) and CE=1 ("Yes" of step 14-2) illustrated in FIG. 14 are satisfied for the first time. Therefore, threshold switching block 41 decreases collision detection threshold τvth from the value (τth+dτth) corresponding to the low temperature to the value τth corresponding to the normal temperature at the time point of x=30. FIG. 15 illustrates temperature sensor output value Tc and peak hold value τdP after the time point of x=30 shown in FIG. 12. In FIG. 15, a vertical axis represents temperature sensor output value Tc and peak hold value τdP[x] of the x-th time of the collision torque, and a horizontal axis represents the number x of the unit times. In FIG. 15, similar to FIG. 12, the collision torque or the threshold on the vertical axis is indicated as the maximum torque ratio (%) which is a ratio with respect to the maximum torque.

As illustrated in FIG. 15, threshold switching block 41 decreases collision detection threshold τvth from a value 70% (=40+30) corresponding to the low temperature to a value 40% corresponding to the normal temperature at the time point of x=30.

As illustrated in FIG. 15, at the time point of x=30 at which the condition of Tc≥Tcth is satisfied, collision torque estimation value τdiso (collision torque estimation error) decreases as temperature Tc increases. Therefore, maximum value τdPP is less than maximum value determination threshold τdPPthA and is sufficiently less than the value τth corresponding to the normal temperature of collision detection threshold τvth. As described above, in the threshold [%] of FIG. 15, even if collision detection threshold τvth is small, the collision erroneous detection hardly occurs.

As described above, in the collision detection method of robot 1001 driven by motor 66 via gear reducer 53 in accordance with the embodiment, the external force torque caused by the collision is estimated as collision torque estimation value τdiso by subtracting the dynamic torque obtained by the inverse dynamic calculation of robot 1001 from the torque output to gear reducer 53 by motor 66. If collision torque estimation value τdiso is greater than the predetermined collision detection threshold τth, it is determined that robot 1001 receives the external force. If the output value of temperature sensor 56 installed to encoder 52 of motor 66 is higher than the predetermined temperature threshold, collision detection threshold τth of collision torque estimation value τdiso is switched to a smaller value. If maximum value τdPP of collision torque estimation value τdiso in a period to a time point of switching collision detection threshold τth from a time point prior to the time point of switching collision detection threshold τth by a predetermined length of time (by x times in the unit time, for example, x minutes if the unit time is one minute) is less than maximum value determination threshold τdPPthA which is less than a value after switching of collision detection threshold τth of collision torque estimation value τdiso, switching of collision detection threshold τth is permitted.

Therefore, even in a case where collision detection threshold τth is switched by using temperature sensor 56 installed to encoder 52, occurrence of the collision erroneous detection can be reduced.

An operation other than that of FIG. 15 will be described below.

Figure 16:
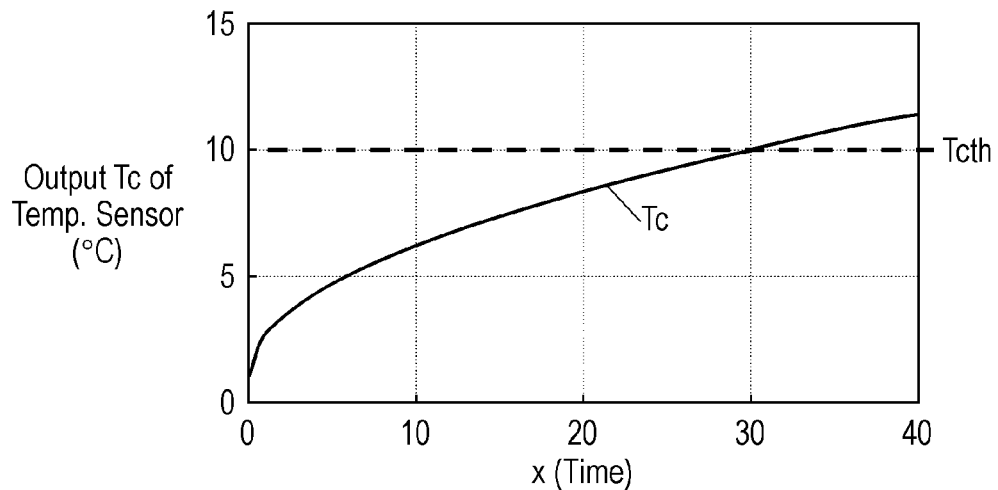
FIG. 16 is a diagram illustrating another operation of the collision detection method in accordance with the embodiment.
Figure 16:
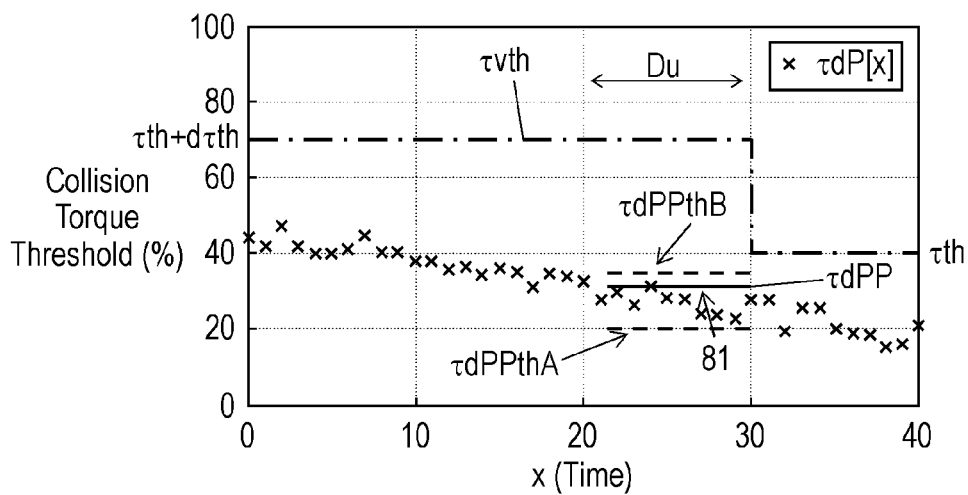
Figure 16:
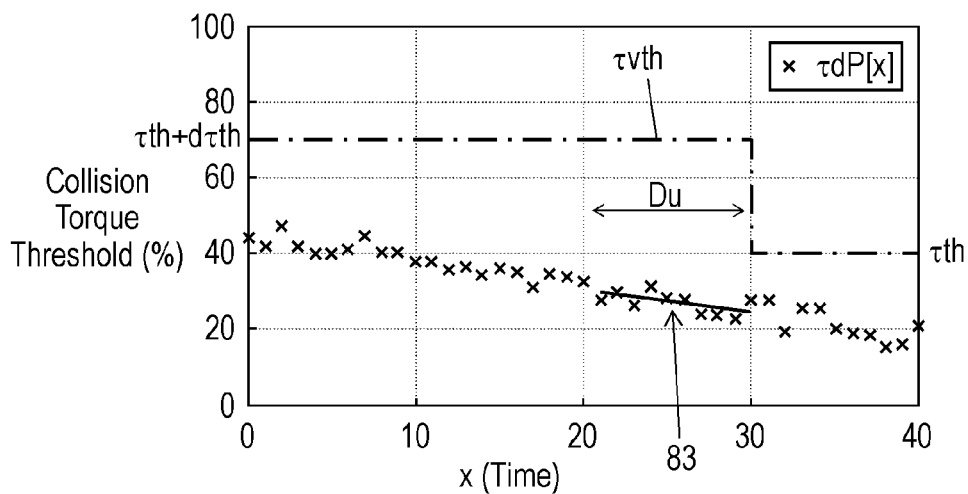

FIG. 16 illustrates temperature sensor output value Tc and peak hold value τdP in another operation of the collision detection method in accordance with the embodiment. In FIG. 16, a vertical axis represents temperature sensor output value Tc and peak hold value τdP[x] of x-th time of the collision torque, and a horizontal axis represents the number x of the unit times. In FIG. 16, similar to FIG. 15, the collision torque or the threshold of the vertical axis is indicated as the maximum torque ratio (%) which is a ratio with respect to the maximum torque. In the operation illustrated in FIG. 16, as compared to FIG. 15, an increase in the temperature of gear reducer 53 is lower than the increase in temperature sensor output value Tc and the viscous friction coefficient D is not sufficiently decreased.

In FIG. 16, at the time point of x=30 at which the condition of Tc≥Tcth is satisfied, maximum value τdPP is equal to or greater than maximum value determination threshold τdPPthA and is less than maximum value determination threshold τdPPthB (72). In this case, conditions of "No" of step 13-1 and "Yes" of step 13-2 of FIG. 13 are satisfied and the processing of step 13-3 is executed.

In the operation illustrated in FIG. 16, as compared to FIG. 15, an increase in the temperature of gear reducer 53 is small and the viscous friction coefficient D is not sufficiently decreased. Therefore, in a case where collision detection threshold τth is decreased, possibility of occurrence of the collision erroneous detection is increased. Therefore, in step 13-3 of FIG. 13, in a case where gradient τdPA of approximate straight line 83 at the time point of x=30 of FIG. 16 is less than gradient determination threshold τdPAth, switching permission determination block 78 sets switching permission value CE to "1" in step 13-3A. In step 13-3, in a case where gradient τdPA of approximate straight line 83 at the time point of x=30 of FIG. 16 is not less than gradient determination threshold τdPAth, switching permission determination block 78 does not change switching permission value CE to leave it as it is and completes the processing.

In FIG. 16, gradient determination threshold τdPAth is set to zero. Since gradient τdPA of approximate straight line 83 illustrated in FIG. 16 is less than gradient determination threshold τdPAth, that is, zero ("Yes" of step 13-3 of FIG. 13), it is determined that the collision torque actually tends to decrease and the possibility of the collision erroneous detection is low, switching permission determination block 78 set switching permission value CE to "1", and collision detection threshold τvth is decreased from the value 70% (=40+30) corresponding to the low temperature to the value 40% condenser the normal temperature at the time point of x=30.

Figure 17:
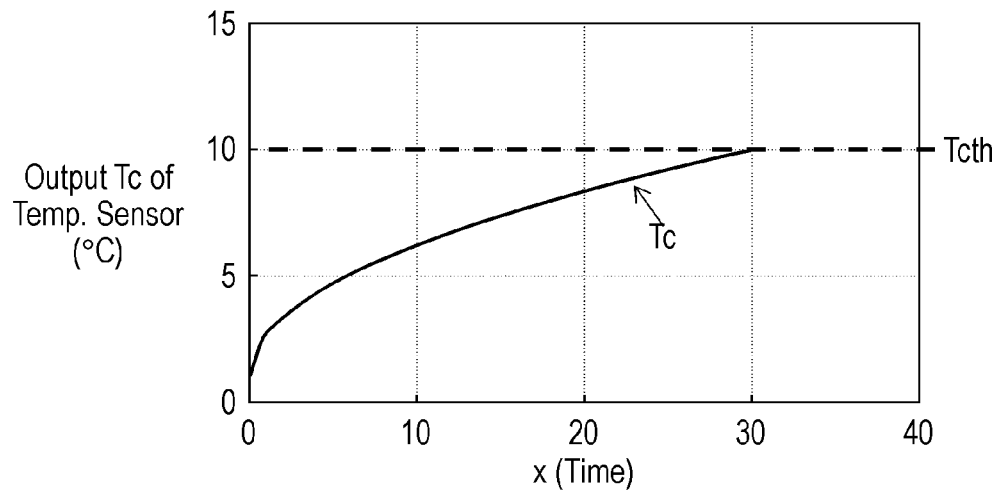
FIG. 17 is a diagram illustrating still another operation of the collision detection method in accordance with the embodiment.
Figure 17:
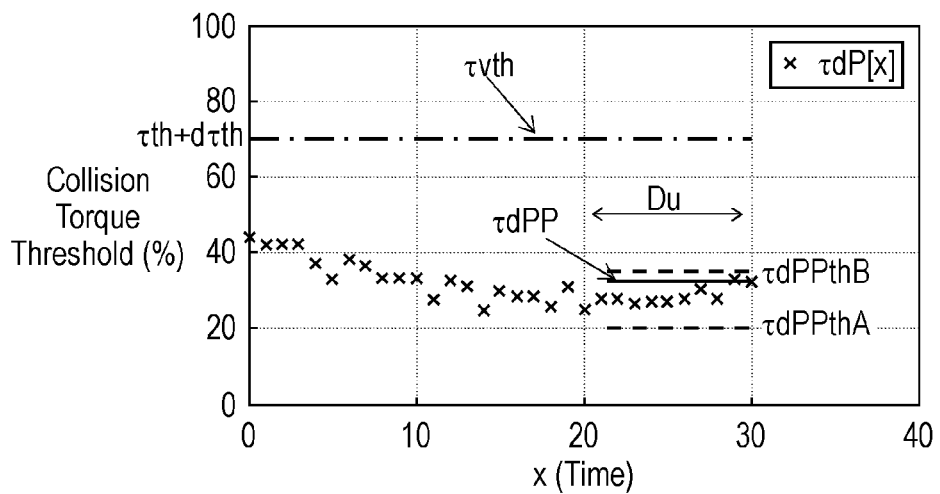
Figure 17:
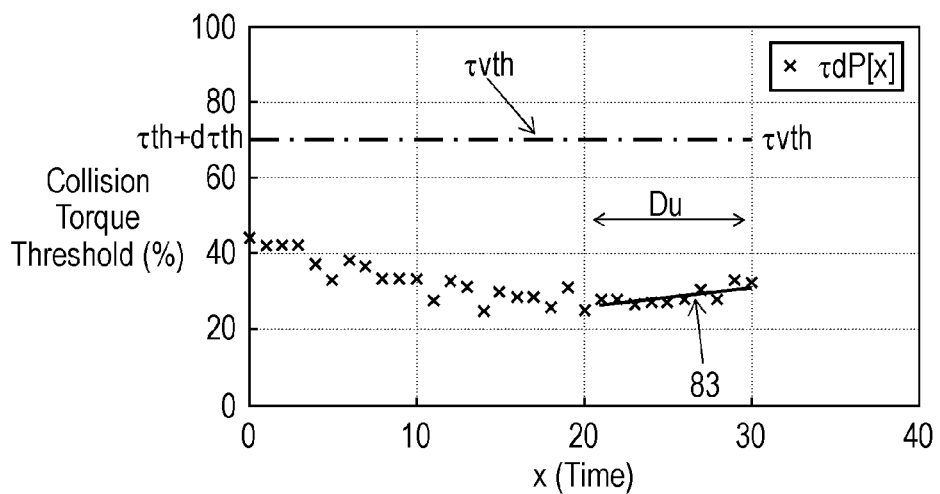

FIG. 17 illustrates temperature sensor output value Tc and peak hold value τdP in still another operation of the collision detection method in accordance with the embodiment. In FIG. 17, a vertical axis represents temperature sensor output value Tc and peak hold value τdP[x] of x-th time of the collision torque, and a horizontal axis represents the number x of the unit times. In FIG. 17, similar to FIG. 15 or 16, the collision torque or the threshold of the vertical axis is indicated as the maximum torque ratio (%) which is a ratio with respect to the maximum torque. FIG. 17 illustrates a case where gradient τdPA of approximate straight line 83 is greater than gradient determination threshold τdPAth (τdPA>0) at the time point of x=30, as compared to FIG. 16.

In the operation illustrated in FIG. 17 an outside air temperature is low and the viscous friction coefficient D of gear reducer 53 is increased in spite of an increase in temperature sensor output value Tc of temperature sensor 56 within encoder 52 due to heat generation of motor 66.

In FIGS. 16 and 17, gradient determination threshold τdPAth is set to zeto.

In this case, collision torque estimation value τdiso (collision torque estimation error) tends to increase, that is, peak hold value τdP[x] tends to increase. Therefore, in order to prevent the collision erroneous detection, in step 13-3 of FIG. 13, the condition of "No" is determined, switching permission value CE is not set to "1", and collision detection threshold τvth is not decreased from the value (70%) corresponding to the low temperature.

Figure 18:
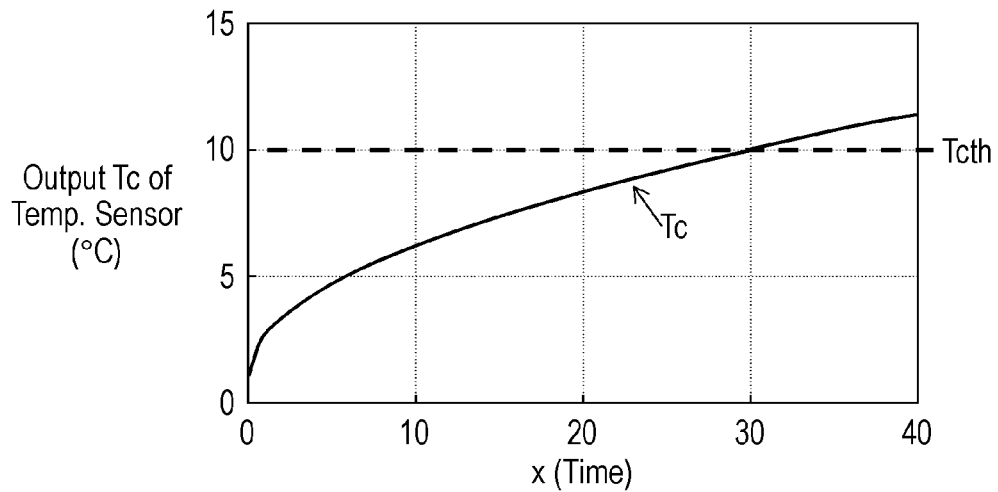
FIG. 18 is a diagram illustrating an operation illustrated in FIG. 17.
Figure 18:
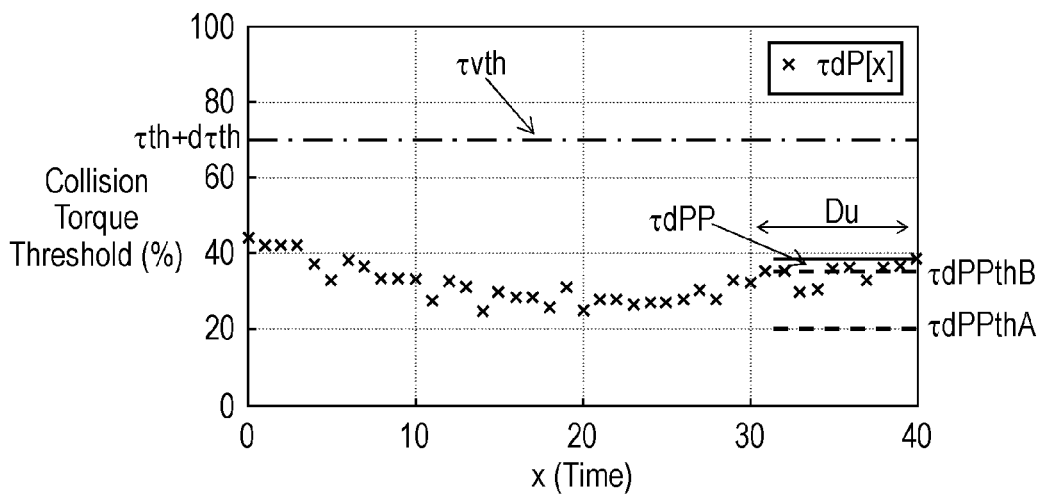
Figure 18:
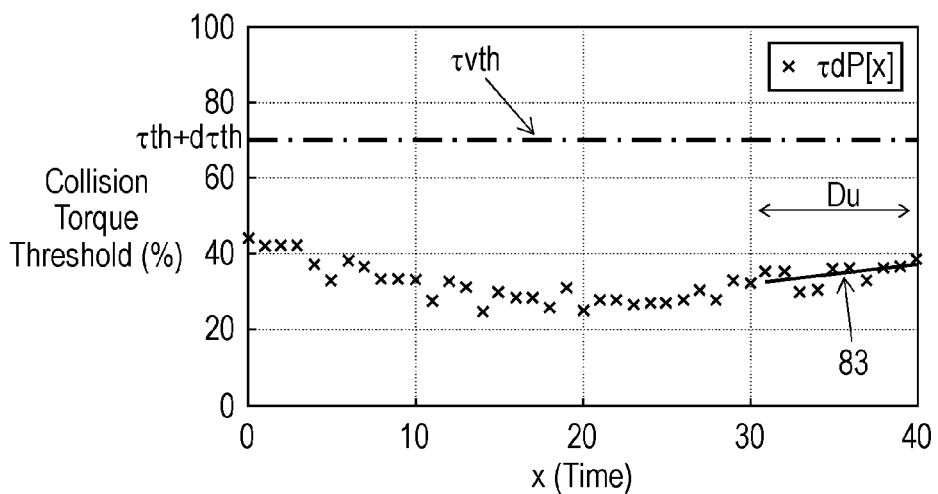

FIG. 18 further illustrates temperature sensor output value Tc and peak hold value τdP of the collision torque at the time point of x=40 in the operation illustrated in FIG. 17. Even after the time point of x=30, collision torque estimation value τdiso (collision torque estimation error) tends to increase, that is, peak hold value τdP[x] tends to increase.

Even if the processing in waveform analysis block 57 illustrated in FIG. 10 is performed at x=31, 32, . . . , 40, switching permission value CE is not set to "1". Therefore, even at the time point of x=40, collision detection threshold τvth is not decreased from the value (70%) corresponding to the low temperature.

Figure 19:
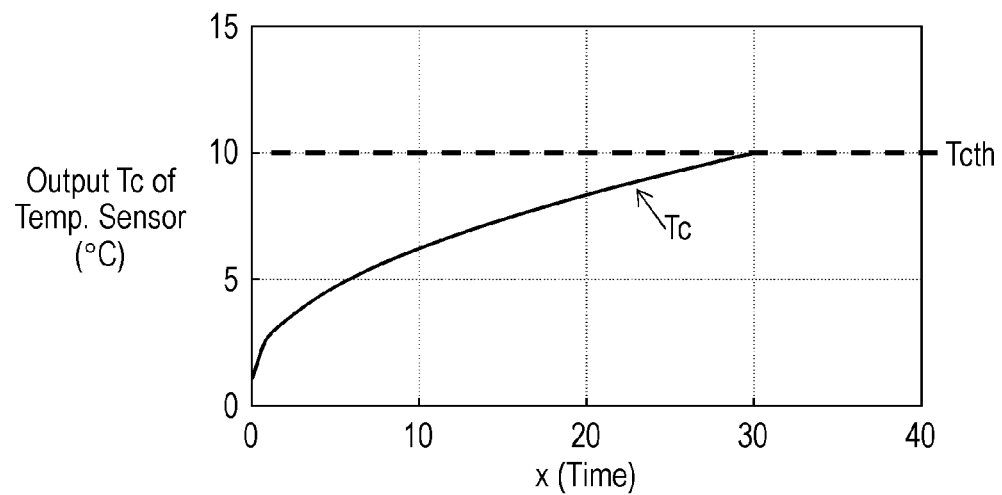
FIG. 19 is a diagram illustrating still another operation in the collision detection method in accordance with the embodiment.
Figure 19:
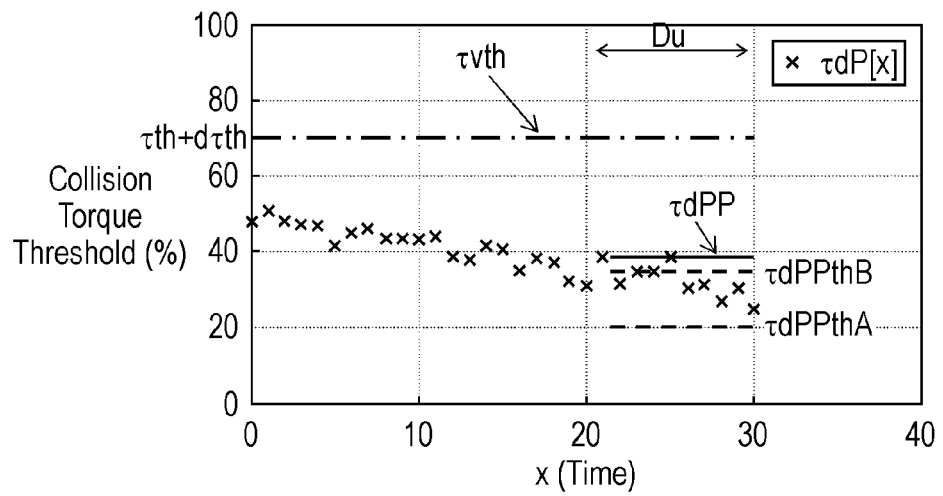

FIG. 19 illustrates temperature sensor output value Tc and peak hold value τdP in a still another operation of the collision detection method in accordance with the embodiment. In FIG. 19, a vertical axis represents temperature sensor output value Tc and peak hold value τdP[x] of xth time of the collision torque, and a horizontal axis represents the number x of the unit times. In FIG. 19, similar to FIGS. 15 to 18, the collision torque or the threshold of the vertical axis is indicated as the maximum torque ratio (%) which is a ratio with respect to the maximum torque. FIG. 19 illustrates an operation, as compared to FIG. 16, in which an increase in temperature of gear reducer 53 is further lower than temperature sensor output value Tc of temperature sensor 56 and the viscous friction coefficient D is not decreased.

In FIG. 19, at the time point of x=30 at which the condition of Tc≥Tcth is satisfied, maximum value τdPP is greater than maximum value determination threshold τdPPthB. That is, the condition of "No" in step 13-1 and the condition of "No" in step 13-2 of FIG. 13 are satisfied.

Figure 20:
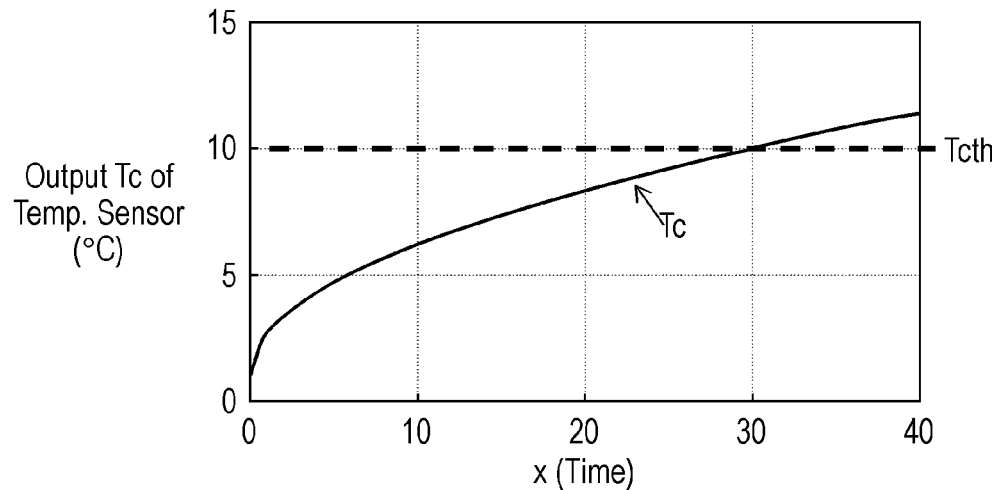
FIG. 20 is a diagram illustrating an operation illustrated in FIG. 19.
Figure 20:
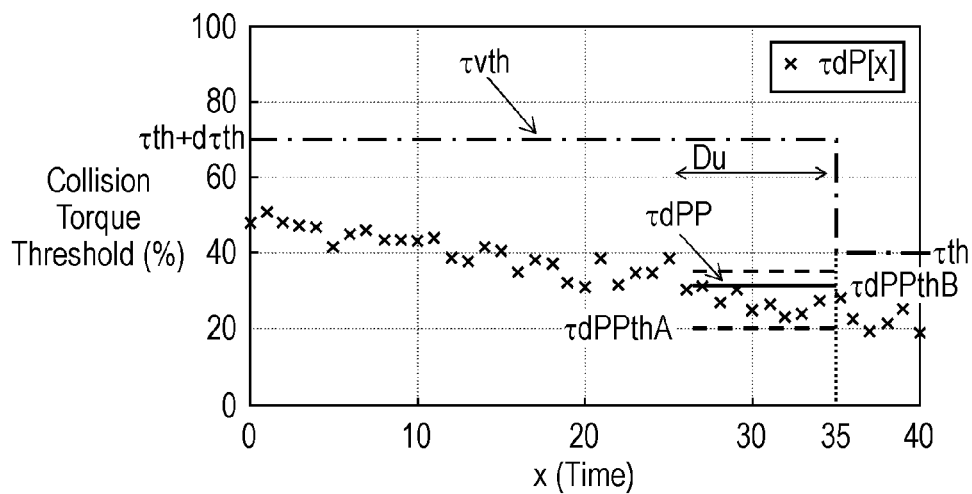
Figure 20:
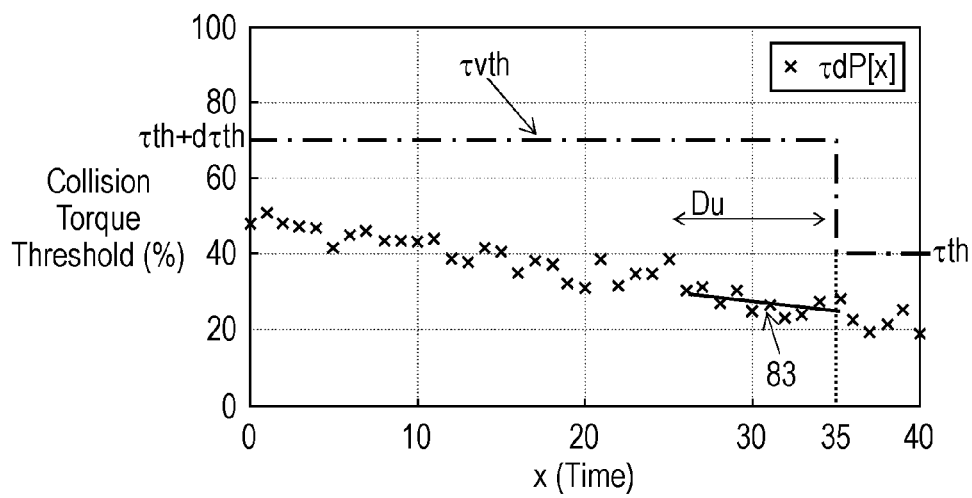

FIG. 20 further illustrates temperature sensor output value Tc and peak hold value τdP after at the time point of x=30 in the operation illustrated in FIG. 19.

In FIG. 20, collision torque estimation value τdiso (collision torque estimation error) tends to decrease, that is, peak hold value τdP[x] tends to decrease, and the condition of "No" in step 13-1, the condition of "Yes" in step 13-2, and the condition of "Yes" in step 13-3 of FIG. 13 are satisfied at the time point of x=35. Therefore, threshold switching block 41 decreases collision detection threshold τvth from the value 70% (=40+30) corresponding to the low temperature to the value 40% corresponding to the normal temperature.

As described above, in the collision detection method of robot 1001 in accordance with the embodiment, maximum value determination threshold τdPPthB which is greater than maximum value determination threshold τdPPthA and less than the value after switching of collision detection threshold τvth, is provided. If maximum value τdPP of collision torque estimation value τdiso in a period to the time point of switching collision detection threshold τvth of collision torque estimation value τdiso from a time point prior to the time point of switching the threshold by a predetermined length of time is greater than maximum value determination threshold τdPPthA and is less than maximum value determination threshold τdPPthB, and gradient τdPA of the approximate straight line which approximates a change (peak hold value τdP[x] at the x-th time) of collision torque estimation value τdiso with respect to time from a time point prior to the switching time point of collision detection threshold τvth by a predetermined length of time (before the x unit times, for example, before x minutes if the unit time is one minute) is negative, switching of collision detection threshold τvth of collision torque estimation value τdiso is permitted.

Therefore, even in a case where an increase in temperature of gear reducer 53 is smaller than temperature sensor output value Tc of temperature sensor 56 installed to encoder 52, and the viscous friction coefficient D is not sufficiently deceased, it is possible to reduce occurrence of the collision erroneous detection.

As described above, robot 1001 includes motor 66, gear reducer 53 connected to motor 66, encoder 51 detecting the rotation of motor 66, temperature sensor 56 installed to encoder 51, and the object (arm 67) that is driven by motor 66 via gear reducer 53. An external force torque caused by the collision is estimated as collision torque estimation value τdiso (τdP) by subtracting the dynamic torque obtained in the inverse dynamic calculation of robot 1001 from the torque output to gear reducer 53 by motor 66. If collision torque estimation value τdiso (τdP) is greater than the predetermined collision detection threshold τvth, it is determined that robot 1001 receives the external force. In a case where temperature (Tc) detected by temperature sensor 56 is lower than predetermined temperature threshold Tcth, the predetermined collision detection threshold τvth is set to the value (τth+dτth). In a case where maximum value τdPP of collision torque estimation value τdiso (τdP) is less than maximum value determination threshold τdPPthA in period Du to the time point (x=30) at which detected temperature (Tc) is equal to or greater than predetermined temperature threshold Tcth from the time point (x=20) prior to the time point (x=30) by a predetermined length of time, the predetermined collision detection threshold vth is set to value τth which is less than value (τth+dτth) at the time point (x=30). In a case where maximum value τdPP of collision torque estimation value τdiso(τdP) is equal to or greater than maximum value determination threshold τdPPthA in period Du, the predetermined collision detection threshold vth is set to value (τth+dτth) at the time point (x=30).

Maximum value determination threshold τdPPthB may be set to a value greater than maximum value determination threshold τdPPthA and less than value τth. Gradient τdPA of approximate straight line 83 obtained by approximating a change of collision torque estimation value τdiso(τdP) with respect to time may be obtained in period Du. In this case, in a case where maximum value τdPP of collision torque estimation value τdiso (τdP) is equal to or greater than maximum value determination threshold τdPPthA and is less than maximum value determination threshold τdPPthB, and gradient τdPA of approximate straight line 83 is negative in period Du, the predetermined collision detection threshold τvth is set to value τth at the time point (x=30). In a case where maximum value τdPP of collision torque estimation value τdiso (τdP) is equal to or greater than maximum value determination threshold τdPPthA and is less than maximum value determination threshold τdPPthB, and gradient τdPA of approximate straight line 83 is zero or positive in period Du, the predetermined collision detection threshold τvth is set to value (τth+dτth) at the time point (x=30). In a case where maximum value τdPP of collision torque estimation value τdiso(dP) is equal to or greater than maximum value determination threshold τdPPthB in period Du, the predetermined collision detection threshold vth is set to value (τth+dτth) at the time point (x=30).

In a case where maximum value τdPP of collision torque estimation value τdiso(τdP) is equal to or greater than maximum value determination threshold τdPPthB in period Du, the predetermined collision detection threshold τvth may be set to value (τth+dτth) at the time point (x=30) regardless of gradient τdPA of approximate straight line 83.

As described above, even in a case where collision detection threshold τvth is switched by using temperature sensor 56 installed to encoder 52, it is possible to reduce occurrence of the collision erroneous detection by the collision detection method of robot 1001 in accordance the embodiment.

INDUSTRIAL APPLICABILITY

A method of detecting collision of a robot according to the present invention can reduce occurrence of erroneous detection of collision and is industrially useful even in a case where a temperature sensor installed to a motor encoder is used without attaching the temperature sensor to a gear reducer, which causes an increase in coat and a decrease in reliability.

REFERENCE MARKS IN THE DRAWINGS

6 position control block
10 speed control block
17 transfer function block
18 block indicating motor and external force
21 rotating direction determination block
26 torque calculation block
30 torque estimation block
31, 40 collision determination block
32 differential element
34, 41 threshold switching block
51 encoder
52 encoder
53 gear reducer
56 temperature sensor
57 waveform analysis block
61, 161 robot mechanism
62, 162 robot control device
63 operation and teaching unit
64 main controller
65 servo controller
66 motor
67 arm
68 belt
74 peak hold block
75 data storage block
76 maximum value extracting block
77 gradient calculation block
78 switching permission determination block
83 approximate straight line
67A (671A-676A) joint axis (object)
1001 robot
CE switching permission value
dτth collision detection threshold increment
Im motor current
KI/s speed integral gain
KP speed proportional gain
KPP position proportional gain
Kt motor torque constant
Kμ dynamic friction coefficient
sgn motor direction signal
Tc temperature sensor output value
Tcth temperature threshold
αcom acceleration component
θcom position command
θL load position
θm position feedback
τdis collision torque
τdiso collision torque estimation value
τdP peak hold value (collision torque estimation value)
τdP[x] peak hold value
τdPA gradient
τdPAth gradient determination threshold
τdPP maximum value
τdPPthA maximum value determination threshold (first maximum value determination threshold)

τdPPthB maximum value determination threshold (second maximum value determination threshold)
τdyn dynamic torque
τdyno dynamic torque estimation value
τm motor-generated torque
τth collision detection threshold
τvth collision detection threshold
τμ dynamic friction torque
τμ dynamic friction torque estimation value
ωcom speed loop command
ωm motor angular velocity

The invention claimed is:

1. A method of detecting a collision, comprising:
providing a robot including a motor, a gear reducer connected to the motor, an encoder detecting a rotation of the motor, a temperature sensor installed to the encoder, and an object which is driven by the motor via the gear reducer;
estimating an external force torque caused by a collision as a collision torque estimation value by subtracting a dynamic torque obtained by an inverse dynamic calculation of the robot from a torque output to the gear reducer by the motor;
determining that the robot receives an external force if the collision torque estimation value is greater than a predetermined collision detection threshold;
setting the predetermined collision detection threshold to a first value in a case where a temperature detected by the temperature sensor is less than a predetermined temperature threshold;
setting the predetermined collision detection threshold to a second value less than the first value at a first time point at which the detected temperature is equal to or greater than the predetermined temperature threshold in a case where a maximum value of the collision torque estimation value is less than a first maximum value determination threshold in a period to the first time point from a second time point prior to the first time point by a predetermined length of time;
setting the predetermined collision detection threshold to the first value at the first time point in a case where the maximum value of the collision torque estimation value is equal to or greater than the first maximum value determination threshold in the period;
providing a second maximum value determination threshold which is greater than the first maximum value determination threshold and is less than the second value; and
obtaining a gradient of an approximate straight line obtained by approximating a change of the collision torque estimation value with respect to time in the period,
wherein said setting the predetermined collision detection threshold to the first value at the first time point in the case where the maximum value of the collision torque estimation value is equal to or greater than the first maximum value determination threshold in the period comprises:
setting the predetermined collision detection threshold to the second value at the first time point in a case where the maximum value of the collision torque estimation value is equal to or greater than the first maximum value determination threshold and is less than the second maximum value determination threshold and the gradient of the approximate straight line is negative in the period;
setting the predetermined collision detection threshold to the first value at the first time point in a case where the maximum value of the collision torque estimation value is equal to or greater than the first maximum value determination threshold and is less than the second maximum value determination threshold and the gradient of the approximate straight line is zero or positive in the period: and
setting the predetermined collision detection threshold to the first value at the first time point in a case where the maximum value of the collision torque estimation value is equal to or greater than the second maximum value determination threshold in the period.

2. The method of claim 1, wherein said setting the predetermined collision detection threshold to the first value at the first time point in the case where the maximum value of the collision torque estimation value is equal to or greater than the second maximum value determination threshold in the period comprises setting the predetermined collision detection threshold to the first value at the first time point regardless of the gradient of the approximate straight line in a case where the maximum value of the collision torque estimation value is equal to or greater than the second maximum value determination threshold in the period.

* * * * *